US009282169B1

(12) United States Patent
Chang

(10) Patent No.: US 9,282,169 B1
(45) Date of Patent: Mar. 8, 2016

(54) REAL-TIME USER INTERACTION-BASED ALTERATIONS TO THE SCOPE OF DATA SYNCHRONIZATION BETWEEN CLIENT AND REMOTE DEVICES

(71) Applicant: OXYGEN CLOUD, INC., Redwood City, CA (US)

(72) Inventor: Peter C. Chang, Union City, CA (US)

(73) Assignee: Oxygen Cloud, Inc., Redwood City, CA (US)

( * ) Notice: Subject to any disclaimer, the term of this patent is extended or adjusted under 35 U.S.C. 154(b) by 350 days.

(21) Appl. No.: 13/941,309

(22) Filed: Jul. 12, 2013

(51) Int. Cl.
*G06F 15/16* (2006.01)
*H04L 29/06* (2006.01)
*G06F 17/30* (2006.01)

(52) U.S. Cl.
CPC ............... *H04L 67/42* (2013.01); *G06F 17/30* (2013.01); *G06F 17/30578* (2013.01); *G06F 17/30581* (2013.01)

(58) Field of Classification Search
CPC ............. G06F 17/30; G06F 17/30578; G06F 17/30581
USPC ........................... 709/202–205; 707/610–612
See application file for complete search history.

(56) References Cited

U.S. PATENT DOCUMENTS

| 2004/0225731 A1* | 11/2004 | Piispanen | G06F 17/30581 709/203 |
| 2005/0044235 A1* | 2/2005 | Balahura | G06F 17/30578 709/227 |
| 2009/0006529 A1* | 1/2009 | Singh | G06F 17/30174 709/203 |
| 2013/0041868 A1* | 2/2013 | Rao | G06F 17/30176 707/610 |
| 2013/0159389 A1* | 6/2013 | Mahood | G06Q 10/107 709/203 |
| 2013/0262385 A1* | 10/2013 | Kumarasamy | G06F 17/30581 707/634 |
| 2013/0304697 A1* | 11/2013 | Movida | G06F 17/30575 707/610 |
| 2014/0258418 A1* | 9/2014 | Subramani | H04L 67/1095 709/205 |
| 2014/0337284 A1* | 11/2014 | Orth | G06F 17/30115 707/610 |
| 2014/0337285 A1* | 11/2014 | Gokhale | G06F 11/1464 707/610 |

* cited by examiner

*Primary Examiner* — Bharat N Barot
(74) *Attorney, Agent, or Firm* — Kilpatrick Townsend & Stockton LLP

(57) ABSTRACT

Methods, apparatus and systems for altering a scope of data synchronization are disclosed. The scope of data synchronization is altered in real-time via user interactions with the data. In one embodiment, a client device may include folder stubs that reference folders of information stored at a remote server. In response to a user selecting the folder stub, additional folder and/or file stubs provided within the folder are acquired by the client device from the remote server, and a scope of data synchronization is expanded to include the path to the folder referenced by the folder stub. The scope of data synchronization may also be contracted. In response to a user commanding the client device to de-synchronize a synchronized folder, the scope of synchronization may be contracted to exclude the folder and any sub-folders.

25 Claims, 16 Drawing Sheets

REAL-TIME USER INTERACTION-BASED ALTERATIONS TO THE SCOPE OF DATA SYNCHRONIZATION BETWEEN CLIENT AND REMOTE DEVICES

BACKGROUND

Embodiments of the present invention relate to synchronizing data, and in particular to altering the scope of data synchronization.

This section is intended to introduce the reader to various aspects of art that may be related to various aspects of the present techniques, which are described and/or claimed below. This discussion is believed to be and provided for the purposes of being helpful in presenting the reader with background information to facilitate a better understanding of the various aspects of the present disclosure. Accordingly, it should be understood that these statements are to be read in this light, and not as an admission or admissions of prior art.

Over the last decade there has been a significant surge in the availability of personal computing devices, including mobile devices having a wide range of operational capabilities such as wired/wireless communication, high resolution graphics, touch-screen interfaces, etc. and being coined as notepads, tablets, cell-phones, etc. With this proliferation of personal computing devices, whether they be mobile in nature or more static in nature, such as a desktop computer, it is not uncommon for a single individual to have multiple devices, nor is it uncommon for the different devices to have potentially large performance differences, such as the relatively large storage capacity and processing power of a desktop computer as compared to a mobile device.

To serve a variety of purposes, including multiple-device file sharing, file-backup, and multi-user access to data, numerous techniques for synchronizing data between two or more devices have been developed. The environments in which data synchronization has been implemented are many. For example, in a single-user type of environment a user may synchronize data between two personal devices such as a mobile telephone and desktop computer, or one personal device such as a mobile phone and a remote third party server. In a multi-user type of environment a user may synchronize data between one or more of their own devices and one or more devices associated with other individuals. In a corporate environment a central network may host data that is shared or otherwise can be synchronized with one employee device at a time. In many examples, a cloud server may play a role in performing or otherwise facilitating synchronization. For example, a user of a computing device may synchronize their data with the cloud server for data backup purposes. For another example, a user of multiple computing devices may synchronize their data with the cloud server so as to facilitate sharing of that data across their devices and/or with other individuals. In other words, the prevalence of synchronization techniques are widespread and the different types of implementations numerous.

In many known data synchronization techniques the ability for a user to alter the scope of data synchronization, that is, to alter the files and folders that are or can be synchronized between multiple devices, is severely constrained. For example, Dropbox™ by Dropbox, Inc. of San Francisco, Calif. provides cloud storage via which data of a personal computing device can be synchronized with the cloud storage. As a result of synchronizing data from one device with a cloud server, that data may then be synchronized across other devices as well. A fundamental limitation, however, is that by default any data that is copied to a Dropbox™ folder on one computing device is necessarily synchronized with the cloud server and any other associated devices. If only a limited number of files and folders are being used, this limitation may not be a significant burden. However, when the number of files and folders are increased, especially relative to the computing and/or storage capacity of associated devices, the automatic synchronization of all files and folders is burdensome if not entirely debilitating. In recent versions of Dropbox™ it is possible select specific folders to be synchronized or not synchronized, but this requires the user to navigate a sequence of application preference menu's by which they consciously select individual folders to synchronize or to not synchronize. Such menu navigation is not only burdensome to the user, it is also limited in that the user can only select a first level of folders to synchronize or not synchronize. Selection to synchronize any particular folder results in all sub-folders, sub-sub-folders, etc. being synchronized, which again can be debilitating if one folder includes large amounts of content in the sub-folders since the user is forced to synchronize all of that folder's contents—including all sub-folders, sub-sub-folders, etc.—which is not only time-, bandwidth-, and capacity-consuming but also inconveniently necessary to access just one file from that folder or its sub-folders.

BRIEF SUMMARY

Embodiments of the present invention overcome some or all of the aforementioned deficiencies in the related art and may provide one or more additional advantages as discussed herein. In one embodiment, a method of altering a scope of data synchronization at a client computing device is disclosed. The method includes establishing, by the client computing device, a connection to a remote computing system that is located remotely from the client computing device. The method also includes displaying representations of stub folders via the client computing device, each stub folder referencing a folder of information stored at the remote computing system. The method further includes receiving a user selection of one of the stub folders. In response to receiving the user selection of one of the stub folders, the folder of information referenced by the selected stub folder is synchronized between the client computing device and the remote computing system resulting in a synchronized folder of information.

In one embodiment, a client computing device is disclosed. The client computing device includes a storage element for storing data, a user interface for providing information to a user and receiving inputs from the user, a communication interface for communicating with a remote computing system that is located remotely from the client computing device, and a processor coupled to the storage element, the user interface, and the communication interface. The processor is operable to perform a variety of operations. These operations include establishing a connection to the remote computing system via the communication interface, displaying, via the user interface, representations of stub folders, each stub folder referencing a folder of information stored at the remote computing system, receiving via the user interface a user selection of one of the stub folders, and in response to receiving the user selection of one of the stub folders, synchronizing the folder of information referenced by the selected stub folder between the client computing device and the remote computing system resulting in a synchronized folder of information.

In one embodiment, a method of altering a scope of data synchronization at a remote computing system is disclosed. The method includes establishing, by the remote computing system, a connection to a client computing device that is located remotely from the remote computing system. The method further includes receiving, from the client computing device, a reference to a folder of information stored at the remote computing system, the reference being generated from one of a plurality of stub folders and in response to a user selection of the one of the plurality of stub folders. In response to receiving the reference to a folder of information stored at the remote computing system, the folder of information is synchronized between the client computing device and the remote computing system resulting in a synchronized folder of information.

In one embodiment, a remote server computing system is disclosed. The remote server computing system includes a storage element for storing data, a communication interface for communicating with a client computing device that is located remotely from the remote computing system, and a processor coupled to the storage element and the communication interface. The processor is operable to perform a variety of operations. These operations include establishing a connection to the client computing device via the communication interface, receiving, from the client computing device and via the communication interface, a reference to a folder of information stored in the storage element of the remote computing system, the reference being generated from one of a plurality of stub folders and in response to a user selection of the one of the plurality of stub folders, and in response to receiving the reference to a folder of information stored in the storage element of the remote computing system, synchronizing the folder of information between the client computing device and the remote computing system resulting in a synchronized folder of information.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

FIGS. 9A-9E illustrate a graphical user interface implemented to expand the scope of data synchronization according to an embodiment.

DETAILED DESCRIPTION

Figure 1:
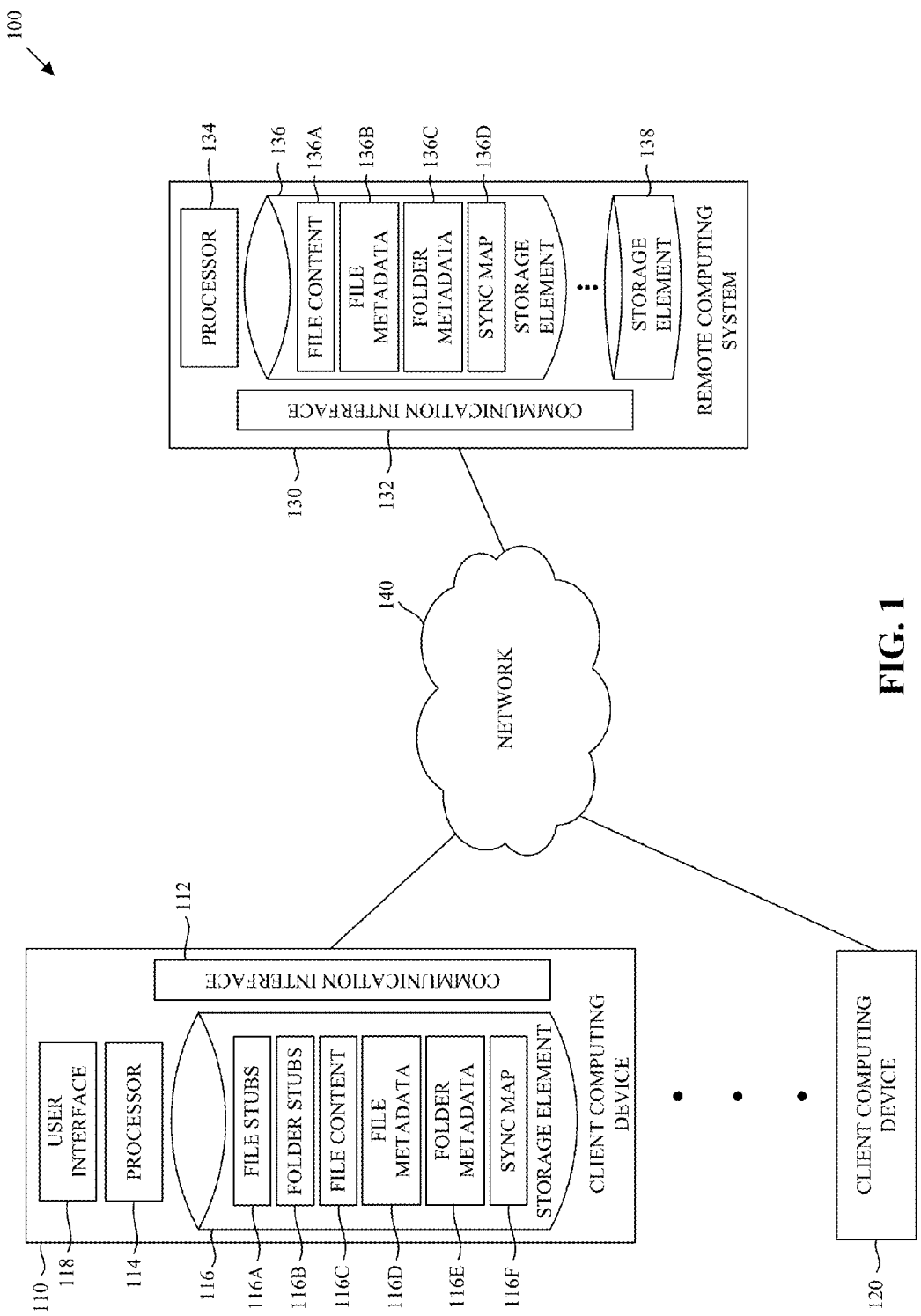
FIG. 1 is a simplified system for altering the scope of data synchronization according to an embodiment.

Embodiments of the present invention generally relate to techniques for altering the scope of data synchronization in real-time based on user-interactions with the data. The scope of data synchronization generally refers to a set of paths in a file system within which data may actually be synchronized (e.g., a synchronized file) or representations of data (e.g., file stubs and folder stubs) that is available to be synchronized are provided. Paths in the file system that are outside of the scope of data synchronization thus typically include data that is not synchronized between two devices; that is, the unsynchronized data is data provided or otherwise stored at one device (e.g., a remote cloud server) but not at the other device (e.g., a personal computing device).

In some embodiments, to assist the process of altering the scope of data synchronization, file stubs and folder stubs are utilized. A file stub is a local representation of a file stored at a remote device. On a local device, the file stub may visually appear as the file itself, or may have some graphical indication that the file stub is simply a representation of a remotely stored file. It should be recognized that with respect to a file stub provided at a local device, the content of the file is stored at the remote device, not at the local device. The file stub typically includes a location pointer that points to, or otherwise references, a location of the file content at the remote device. In response to a user selection of the file stub at the local device, the file content is acquired from the remote device. A folder stub, on the other hand, is a local representation of a folder stored at a remote device. On a local device, the folder stub may visually appear as the folder itself, or may have some graphical indication that the folder stub is simply a representation of a remotely stored folder. It should be recognized that with respect to a folder stub provided at a local device, the content of the folder is stored at the remote device, not at the local device. The content of the remotely stored folder may include a variety of content, such as files and/or folders. The folder stub typically includes a location pointer that points to, or otherwise references, a location of the file folder at the remote device. In response to a user selection of the folder stub at the local device, representations of the folder content are acquired from the remote device. Representations of the folder content may include file stubs and/or folder stubs that reference actual files and folders provided within the selected folder at the remote device.

In many embodiments, the scope of data synchronization may be altered in real-time based on user-interactions with that data. By altering the scope of data synchronization in real-time, the aforementioned set of paths in the file system may be increased or decreased, in real-time, based on user interactions with the data. The user interactions that alter the scope of data synchronization may vary depending on the particular implementation and depending on whether it is desired to increase or decrease the scope of data synchronization. In many embodiments, folder stubs or other representations of file system paths may assist in altering the scope of data synchronization in real-time. For example, in one embodiment, to expand the scope of data synchronization, a user of a local device may initially have locally stored file stubs and folder stubs that reference actual files and folders stored at a remote device. In response to the user selecting a folder stub, the scope of data synchronization may be expanded to include the remotely-stored folder referenced by the folder stub. In another embodiment, to expand the scope of data synchronization a user of a local device may acquire (e.g., copy from a flash drive, disk drive, or other storage medium) or otherwise generate (e.g., create) a new locally stored folder. For another example, in one embodiment, to contract the scope of data synchronization, the user of the local device may delete a synchronized folder or otherwise command the local device to de-synchronize the synchronized folder, which may result in the locally stored folders being replaced with folder stubs that reference the folder stored at the remote device and the content within the locally stored folders being deleted at the local device.

By facilitating real-time changes in the scope of data synchronization based on user-interactions with the data, user interactions with data become seamless, regardless of where the data is actually stored (e.g., locally or remotely). The user does not have to predetermine which folders of data they would like synchronized prior to accessing that data; rather, folders and files become synchronized in real-time response to the user's interaction with those folders and files. Further, the user is provided with an unprecedented ability to control a level of specificity with respect to which folders are within the scope of synchronization. As a result of user-interaction with specific folders, sub-folders, sub-sub-folders, etc., those specific paths, regardless of their depth and even at different or varying depths in the file system hierarchy, are added to the scope of synchronization. Such techniques are particularly advantageous when implemented on devices having limited storage capacity as compared to the number and/or size of files and folders that are remotely stored and available to be synchronized, as well as when implemented on device having limited communication bandwidth. By selecting a folder to be synchronized, neither the actual contents of that folder nor are the contents of any sub-folders are actually communicated to or stored at the local device. Rather, stub files and stub folders, that reference the remotely stored content of the selected folder, are acquired or otherwise generated and represent the available content. As a result, the user can quickly and easily see the entire scope of content available to be synchronized as the user navigates the content, yet can choose to selectively pinpoint the actual content to be accessed.

It should be recognized that throughout the specification references are often made to a client, personal, or local personal computing devices, and a remote computing system or server. However, one skilled in the art would recognize that embodiments are not limited to devices that are geographically separated from each other by large distances or even devices that are separately owned or managed. That is, the multiple devices described herein could be multiple computing devices owned by a single person in close proximity to one another (e.g., a desktop computer and a mobile telephone). Further, it should be recognized that in some embodiments the synchronization techniques described herein may be partially or entirely performed within a single electronic computing device. For example, a desktop computer may include multiple storage mediums, such as a low-capacity high-speed medium (e.g., a solid state drive or memory chip) and a high-capacity low-speed medium (e.g., a hard disk drive), where data is selectively synchronized between the multiple storage mediums. Accordingly, the data synchronization techniques described herein may be implemented in a wide variety of environments, some of which have already been described.

Referring now to the drawings, in which like reference numerals represent like parts throughout the several views, FIG. 1 provides a simplified system 100 for altering the scope of data synchronization according to an embodiment. System 100 includes one or more client computing devices 110-120 and a remote computing system 130 all interconnected via a network 140.

Client computing devices 110-120 may include any suitable electronic computing devices, such as a mobile phone, a personal digital assistant (PDA), a handheld or portable device (iPhone™, Blackberry™, etc.), a notebook, personal computer, note pad, a tablet, a netbook, a media player, portable storage medium, or other electronic device configured for wired or wireless communication. At least some of client computing devices 110-120 may be associated with end users having a desire to share data with others, share data between multiple devices owned by the user, backup data to another device (either owned by the user or a third party), or otherwise access or synchronize data between the client computing device and at least one other computing device or system, and/or between multiple storage elements within the device.

Client computing devices 110-120 may include any suitable components typically found in such electronic device necessary to perform the operations discussed herein. In one embodiment and as illustrated in FIG. 1, a client computing device 110 includes a communication interface 112, a processor 114, a tangible non-transitory computer readable storage element 116, and a user interface 118. Communication interface 112 is any suitable interface or interfaces operable to enable communication between client computing device 110 and other elements of system 100, such as remote computing system 130. Communication interface 112 may be operable to communicate with other elements of system 100 via a wired or wireless connection, using any one or more of a variety of known communication protocols, such as TCP/IP, OSI, FTP, UPnP, NFS, CIFS, and AppleTalk™. Processor 114 is any suitable computing processor or processors operable to execute instructions that cause client computing device 110 to perform one or more of the operations discussed herein. For example, processor 114 may execute software code stored in one or more storage elements such as storage element 116. Storage element 116 may be any storage element or storage elements suitable for storing data, software code, and other information used by client computing device 110. For example, storage element 116 may include one or more of random access memory (RAM), read only memory (ROM), electrically-erasable programmable read only memory (EEPROM), a hard disk, an optical disk, a solid state drive, etc. User interface 118 may include one or more elements for receiving input from a user and providing outputs to the user. For example, user interface 118 may include a keypad, a display, a touch screen, a mouse, or a combination thereof.

Storage element 116 may include one or more of a variety of information. For example, storage element 116 may include file stubs 116A, folder stubs 116B, file content 116C, file metadata 116D, folder metadata 116E, and/or a synchronization map 116F. A file stub 116A is a local representation of a file stored at a remote device, such as at remote computing system 130. On the client computing device 110, the file stub 116A may visually appear as the file itself, or may have some graphical indication that the file stub 116A is simply a representation of a remotely stored file. It should be recognized that with respect to a file stub 116A provided at a local device, the content of the file is stored at the remote device, such as remote computing system 130, not at the client computing device 110. The file stub 116A typically includes a location pointer that points to, or otherwise references, a location of the file content at the remote device.

A folder stub 116B, on the other hand, is a local representation of a folder stored at a remote device, such as the remote computing system 130. On the client computing device 110, the folder stub 116B may visually appear as the folder itself, or may have some graphical indication that the folder stub 116B is simply a representation of a remotely stored folder. It should be recognized that with respect to a folder stub provided at the client computing device 110, the content of the folder is stored at the remote device, such as remote computing system 130, not at the client computing device 110. The content of the remotely stored folder may include a variety of content, such as files and/or folders. The folder stub 116B typically includes a location pointer that points to, or otherwise references, a location of the file folder at the remote device.

File content 116C refers to the content of an actual file. The file may be any type of file, such as an image encoded using any suitable image encoding algorithm (e.g., JPEG, TIFF, GIF, etc.), a video encoded using any suitable video encoding algorithm (e.g., MPEG, H.264, VC-2, etc.), a document (e.g., a Word™ document, a WordPerfect™ document, an Excel™ spreadsheet, etc.), or any other data type. The content refers to the substantive information that comprises the file.

File metadata 116D refers to any suitable data indicating one or more characteristics of a file or file content associated with the metadata. For example, file metadata 116D may indicate a date and time the file was created or last modified, a name of a user who created and/or modified the file, a version of the file, etc. In some cases, file metadata 116D may be specific to the type of file which the metadata is associated with. For example, the metadata for an image file may indicate image properties such as the number of pixels in the image, the resolution of the image, the type of camera used to acquire the image, etc., whereas metadata for a Word™ document may indicate document properties such as the number of words, lines, and paragraphs in the document.

Folder metadata 116E refers to any suitable data indicating one or more characteristics of a folder associated with the metadata. For example, folder metadata 116E may indicate a date and time the folder was created or last modified, a name of a user who created and/or modified the folder, the size of the contents located within the folder, the number of files and/or sub-folders located within the folder, etc.

Synchronization map 116F refers to information representing one or more paths in a file system that are to be synchronized between the client computing device 110 and one or more other elements of system 100, such as remote computing system 130. The map 116F may take any suitable form, such as a data object, a text file, etc., and is generally readable/writeable by the processor 114 or other components of the client computing device 110. In some embodiments, the map 116F may be dynamically modifiable in real-time as a result of user interactions with folder stubs 116B and/or folders provided at the client computing device 110.

While the aforementioned information is illustrated in FIG. 1 and described herein as being physically located on a single storage element 116, it should be recognized that embodiments are not so limited in that the information may be dispersed across two or more storage elements associated with the client computing device. Further, additional and alternative characteristics and properties of the aforementioned information are further described herein, thus embodiments are not necessarily limited to the aforementioned descriptions.

Remote computing system 130 may be any suitable electronic computing device or system of electronic computing devices operable to store and synchronize files and folders with one or more devices of system 100 such as client computing device 110. In some embodiments, remote computing system 130 may be a plurality of networked computing devices whereby portions of the data files are stored on one or more of the computing devices and/or storage elements. In additional or alternative embodiments, remote computing system 130 may be a cloud-based server or system whereby portions of the data files are stored on one or more of the computing devices and/or storage elements. For simplicity, remote computing system 130 is shown and discussed as a single computing device, although a person of ordinary skill in the art would recognize that remote computing system 130 may be implemented as a plurality of devices and/or storage elements. Further, remote computing system 130 may be located remotely from other elements of system 100, such as client computing device 110. By being remotely located, in some embodiments the remote computing system 130 may be geographically distant from one or more other components of system 100, such as located in a different city or country. In other embodiments, however, remote computing system 130 may be geographically close to one or more other components of system 100, such as within the same room or dwelling. Accordingly, depending on the particular implementation, remote computing system 130 may be a personal computing device such as a mobile phone, a personal digital assistant (PDA), a handheld or portable device (iPhone™, Blackberry™, etc.), a notebook, personal computer, note pad, a tablet, a netbook, a media player, portable storage medium, a NAS drive, an externally or internally connected hard drive, or other electronic device configured for wired or wireless communication, or may be a powerful server or server system such as a cloud-based storage system, a corporate network storage system, or the like.

Remote computing system 130 may include any suitable components typically found in such systems necessary to perform the operations discussed herein. In one embodiment and as illustrated in FIG. 1, remote computing system 130 includes a communication interface 132, a processor 134, and one or more tangible non-transitory computer readable storage elements 136-138. Communication interface 132 is any suitable interface or interfaces operable to enable communication between remote computing system 130 and other elements of system 100, such as one or more of client computing devices 110-120. Communication interface 132 may be operable to communicate with other elements of system 100 via a wired or wireless connection, using any one or more of a variety of known communication protocols, such as TCP/IP, OSI, FTP, UPnP, NFS, CIFS, and AppleTalk™. Processor 134 is any suitable computing processor or processors operable to execute instructions that cause remote computing system 130 to perform one or more of the operations discussed herein. For example, processor 134 may execute software code stored in one or more of storage elements 136-138. Storage elements 136-138 may be any storage element or storage elements suitable for storing data, software code, and other information used by remote computing system 130. For example, storage element 136 may include one or more of random access memory (RAM), read only memory (ROM), electrically-erasable programmable read only memory (EEPROM), a hard disk, an optical disk, etc. In single-user type of environments, a single storage element and its data may be associated with the user. In multi-user type of environments, multiple storage elements and their corresponding data may be individually associated with different users. Multi-user environments are not so limited, however, in that sets of data associated with each of a plurality of users may be stored on the same or different storage elements which are located on the same or different remote computing system.

Storage elements 136-138 may include one or more of a variety of information. For example, storage element 136 may include file content 136A, file metadata 136B, folder metadata 136C, and/or a synchronization map 136D. File content 136A is similar to file content 116C, file metadata 136B is similar to file metadata 116D, folder metadata 136C is similar to folder metadata 116E, and synchronization map 136D is similar to synchronization map 116F. However, this information is all stored at remote computing system 130 rather than client computing device 110, and while ideally in many cases should be identical to the corresponding data at the client computing device 110, at some instances of time the data may be different.

While the aforementioned information is illustrated in FIG. 1 and described herein as being physically located on a single storage element 136, it should be recognized that embodiments are not so limited in that the information may be dispersed across two or more storage elements associated with the client computing device. Further, additional and alternative characteristics and properties of the aforementioned information is further described herein, thus embodiments are not necessarily limited to the aforementioned descriptions.

Network 140 is any suitable network for enabling communications between various entities, such as between client computing devices 110-120 and remote computing system 130. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. The network may also be or include a direct cable connection between devices, such as by serial connection, USB, firewire, or other known direct connect. Components utilized for such a system may depend at least in part upon the type of network and/or environment selected. Network 140 may utilize any suitable protocol, such as TCP/IP, OSI, FTP, UPnP, NFS, CIFS, and AppleTalk™. Communication over the network may be enabled by wired or wireless connections, and combinations thereof.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

Figure 2:
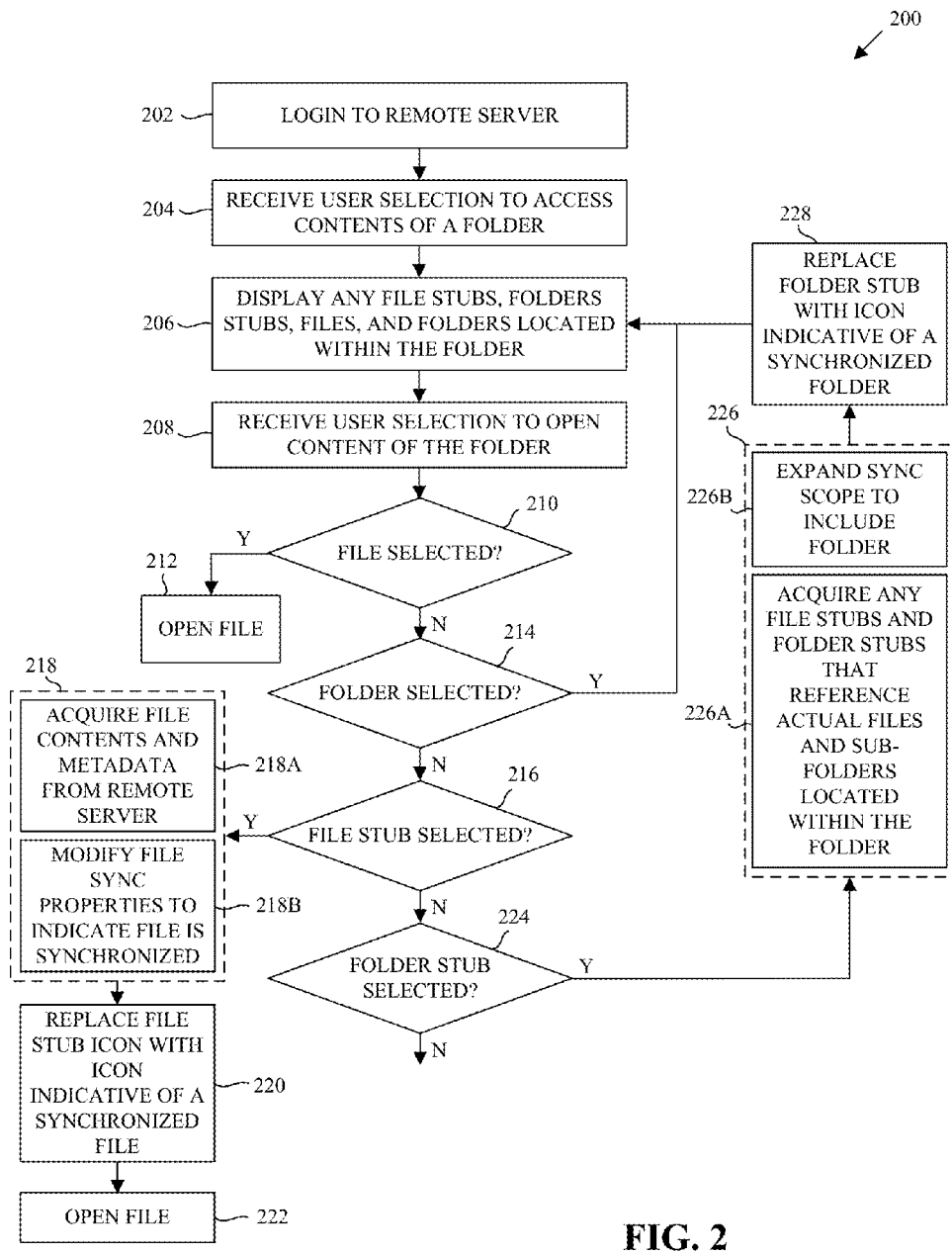
FIG. 2 is a flowchart depicting example operations for expanding the scope of data synchronization at a client computing device according to a first embodiment.

FIG. 2 is a flowchart depicting example operations 200 for expanding the scope of data synchronization at a client computing device according to a first embodiment. The operations 200 are described with reference to one or more of FIGS. 1 and 8A through 11, however it should be recognized that embodiments are not necessarily so limited to the specific computing devices described with reference to FIG. 1, the specific graphical interfaces illustrates in FIGS. 8A through 10E, nor the specific synchronization maps illustrated in FIG. 11.

In operation 202 a user may login or otherwise establish a connection with a remote server. For example, a user of client computing device 110 may login to an account associated with remote computing system 130, or may otherwise establish a connection with remote computing system 130 to facilitate communication between the client computing device 110 and remote computing system 130. In the case of logging into an account associated with remote computing system 130, the user may enter a name and/or password and/or perform additional or alternative authentication processes as known in the art. In establishing a connection with the remote server, the client computing device 110 may establish either a wired or wireless connection with the remote computing system 130, e.g., via communication interface 112.

In operation 204 the client computing device 110 receives a user selection to access contents of a folder. The user selection may be received, e.g., via user interface 118. The user selection may be provided via one or more mechanisms. For example, the user may execute a software application residing on the client computing device 110 which facilitates synchronization between the client computing device 110 and other elements of system 100. For another example, an operating system residing and executing on the client computing device 110 may inherently have synchronization capabilities built directly into the operating system. Accordingly, a user selection to access contents of a folder may include, for example, the user turning on the client computing device, executing an application on the client computing device, etc.

In response to receiving a user selection to access contents of a folder, in operation 206 the client computing device may display, e.g., via user interface 118, any file stubs, folder stubs, files, and folders located within the selected folder. For example, turning briefly to FIGS. 8A and 8B, these figures illustrate a graphical user interface 800 implemented to synchronize a file according to an embodiment. In this particular example, client computing device 110 receives a selection to access contents of a home folder in the file system of client computing device 110, as illustrated by a graphical representation of the current path 810. A variety of data 820 is stored at the client computing device 110 within the home folder of the file system. The data 820 in this particular example includes a number of folder stubs 822 and a file stub 824. Each folder stub 822 refers to a unique folder located at the remote server such as remote computing system 130, whereas each file stub 824 refers to file content located at the remote server such as remote computing system 130. The graphical user interface 800 also shows a variety of metadata 830 that is associated with the folder stubs and file stubs, and includes folder stub metadata 832 and file stub metadata 834. It should be recognized that the folder stubs and file stubs themselves contain at least some metadata regarding the folders and file content referenced by the stubs, where this metadata may include the metadata 830 (such as the date which the stub was last modified) as well as other metadata (e.g., the identity of the person who modified the stub). In the particular example of FIG. 8A, there are no actual folders or files located stored the home directory at the client computing device 110. Thus, the graphical user interface 800 is limited to displaying only folder stubs 102A and file stubs 102B.

In operation 208, the client computing device 110 receives, e.g., via user interface 118, a user selection to open content of the folder. For example, returning briefly to FIG. 8A, a user may provide an indication to the client computing device to open any of the content available within the home directory. While a variety of indications may be provided, such as by touching a screen of the device, selecting an icon with a mouse or other user interface device, providing a voice or cognitive communication, in this particular example a user double-clicks one of the graphical representations of data illustrated in the graphical user interface 800. Depending on the particular contents of the folder being viewed, the user may open different types of content, such as an actual file or folder stored at the client computing device, or a file stub or folder stub provided at the client computing device. In this particular example, the user selects file stub 824 entitled "Android2.txt.cloudx".

Returning to FIG. 2, the client computing device 110 then determines what type of data the user selected and generates a response based on the type of data selected. For example, the client computing device 110 may determine whether the user selected a file, a folder, a file stub, or a folder stub. The resultant processing depends on the type of data selected. For example, in operation 210, it is determined whether the user selects a file. That is, a file which is actually stored at client computing device 110. If so, processing may continue to operation 212 where the client computing device 110 opens the file and, in some cases, displays the file contents or begins to perform executable operations defined by the file (depending on the type of file selected). If not, processing may continue to operation 214 where it is determined whether a folder is selected. That is, a folder which is actually stored at client computing device 110. If so, then processing may return to operation 206 where the contents of the folder, such as any file stubs, folder stubs, files and folders located within the folder are displayed or otherwise presented to the user. If not, then processing may continue to operation 216.

In operation 216 it is determined whether a file stub is selected. If so, then processing may continue to operation 218 where the file referenced by the file stub is synchronized between the client device 110 and the remote computing system 130. In synchronizing the file, one or more of a variety of operations may be performed. For example, in operation 218A, the file contents referenced by the file stub and/or file metadata associated with the file contents may be acquired by the client device 110 from the remote computing system 130. Such data may be communicated, e.g., via communication interfaces 112 and 132. In operation 218B, file synchronization properties associated with the file content may be modified to indicate that the file is synchronized. Such file synchronization properties may be stored in the associated file metadata or other suitable location, and may be referenced by the processor 114 of client computing device 110 at various times (e.g., upon power-up, upon execution of a synchronization application, etc.) when determining which files stored at client computing device 110 are supposed to be maintained in a state of synchronization with a corresponding file located at the remote computing system 130. Separate from or as part of the file synchronization operation 218, in operation 220 a file stub icon or other graphical, audible, or other representation of the file stub may be replaced with an icon (or other representation) of a synchronized file, and in operation 222 the file contents may be opened.

Figure 8A:
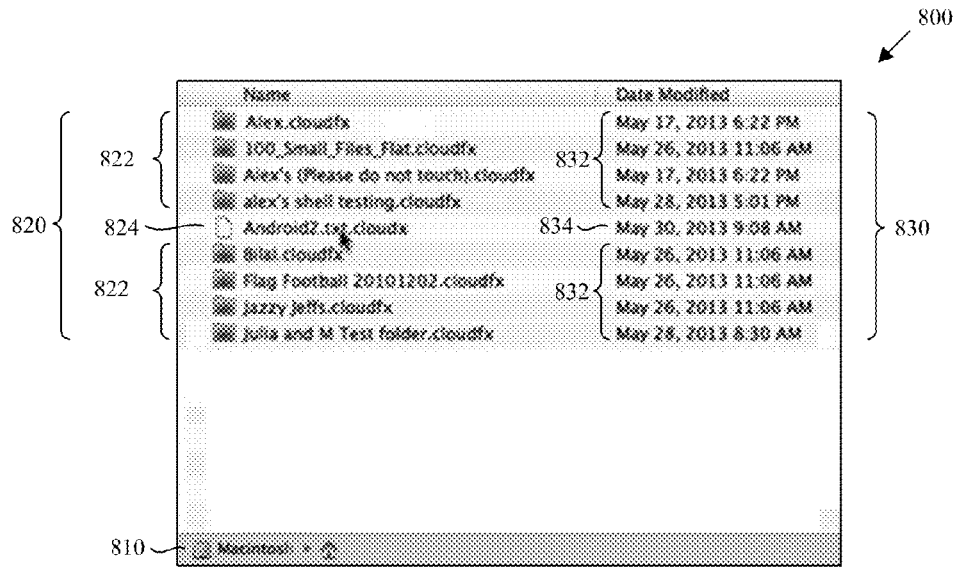
FIGS. 8A-8B illustrate a graphical user interface implemented to synchronize a file according to an embodiment.
Figure 8B:
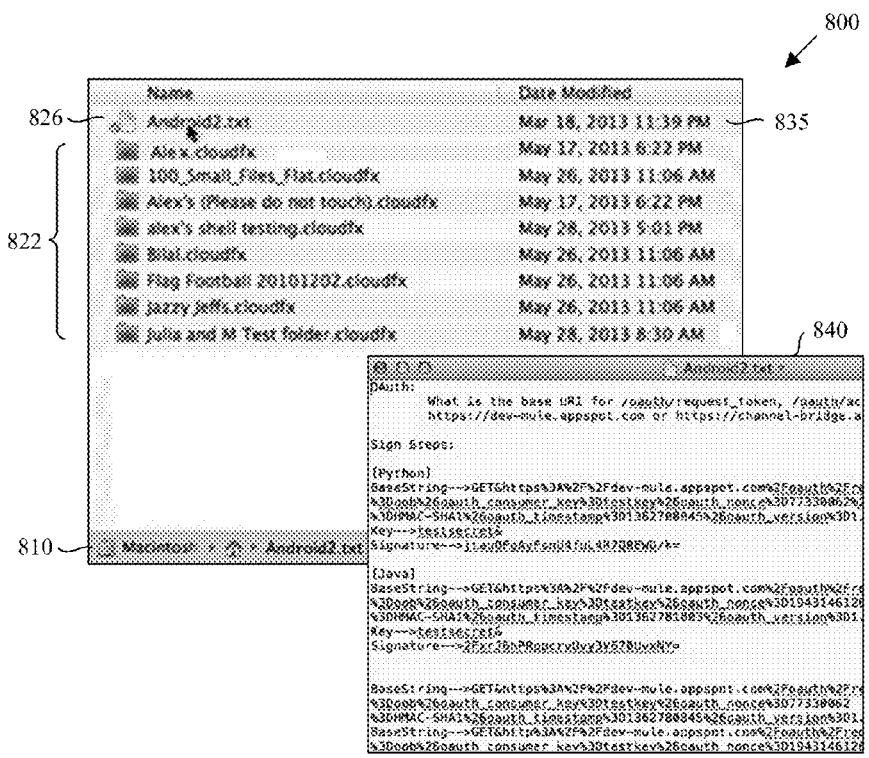

For example, turning briefly to FIGS. 8A and 8B, in response to the user selecting the file stub 824 ("Android2.txt.cloudx"), the client computing device 110 may acquire the contents of the file referenced by the file stub 824, which in this case are the contents and metadata of a text file entitled "Android2.txt". The graphical user interface 800 replaces the icon of the stub file 824 with an icon indicating that the file is synchronized 826, and modifies the file synchronization properties associated with that file to indicate that the file is synchronized. In some embodiments, file metadata 835 may be displayed as well, where the file metadata 835 includes metadata associated with the file "Android2.txt" in contrast to the file stub metadata 834 which is associated with the stub file "Android2.txt.cloudx". Further, the contents of the file are automatically opened in response to the user selection of the file stub and based on a program associated with that particular type of file. In this particular example, the file is a text file, and thus a text editor window 840 pops up and displays the contents of the text file.

Returning to FIG. 2, in operation 224 the client computing device 110 may determine whether a folder stub is selected by the user. If so, then processing may continue to operation 226 where the folder referenced by the folder stub is synchronized between the client device 110 and the remote computing system 130. In synchronizing the folder, one or more of a variety of operations may be performed. For example, in operation 226A, file stubs and/or folder stubs that reference actual files and folders stored within the folder may be acquired. In some embodiments, the actual file stubs and/or folder stubs may not be acquired per se, but rather metadata or other information operable to define such stubs may be acquired by the client device, and the client device may then generate the file stubs and/or folder stubs itself. Such data may be communicated, e.g., via communication interfaces 112 and 132. In operation 226B, the synchronization scope is expanded to include the folder selected by the user. In expanding the synchronization scope, information representing the scope of synchronization, such as synchronization map 116F, may be modified to include the path to the selected folder. Such a map may be stored at the client computing device 110 or other suitable location, and may be referenced by the processor 114 of client computing device 110 at various times (e.g., upon power-up, upon execution of a synchronization application, etc.) when determining which folders stored at client computing device 110 are supposed to be maintained in a state of synchronization with a corresponding folder located at the remote computing system 130. Separate from or as part of the folder synchronization operation 226, in operation 228 a folder stub icon or other graphical, audible, or other representation of the folder stub may be replaced with an icon (or other representation) of a synchronized folder, and processing may then return to operation 206 where the contents of the synchronized folder (e.g., file stubs and folder stubs) may be displayed.

Figures 9A, 9B:
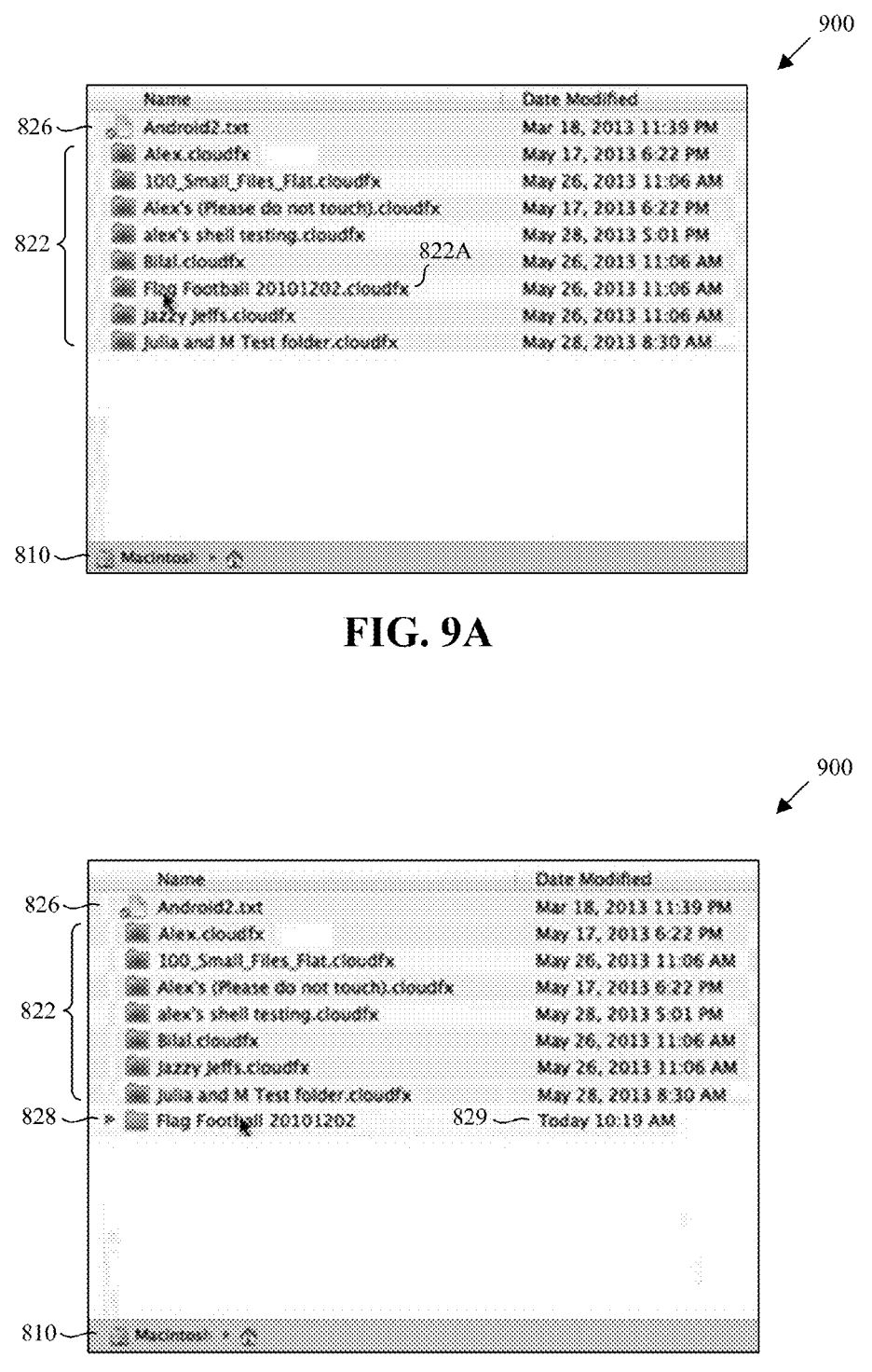
Figure 9C:
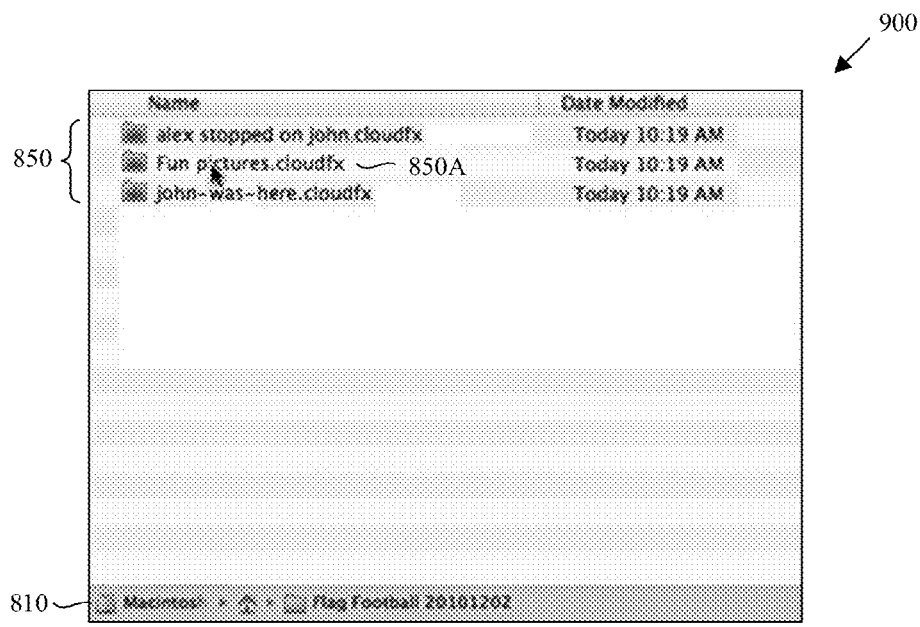

For example, turning briefly to FIGS. 9A to 9E, FIGS. 9A to 9E illustrate a graphical user interface implemented to expand the scope of data synchronization according to an embodiment. FIG. 9A illustrates a graphical user interface 900 similar to the graphical user interface 800 described with reference to FIG. 8B, where a number of folder stubs 822 and a synchronized file 826 are provided in the home directory illustrated by the current path information 810. In this particular example, the client computing device 110 receives a user selection of the folder stub 822A entitled "Flag Football 20101202.cloudfx". In response to the user selection and as illustrated in FIG. 9B, the icon indicative of the folder stub 822A is replaced with an icon indicative of a synchronized folder 828. In some embodiments, folder metadata 829 may be displayed as well, where the folder metadata 829 includes metadata associated with the folder "Flag Football 20101202" in contrast to the folder stub metadata 832 which is associated with the stub file "Android2.txt.cloudx". Further, file stubs and/or folder stubs that reference actual files or sub-folders stored in the "Flag Football 20101202" folder at the remote computing system 130 are also acquired or otherwise generated. Accordingly, either automatically in response to the user selecting the folder stub 822A, or in response to a subsequent user selection of the folder 828, those new file stubs and folder stubs are displayed to the user. For example, with reference to FIG. 9C, the graphical user interface 900 may then display new folder stubs 850, where the new folder stubs 850 reference sub-folders of the "Flag Football 20101202" folder that are stored at the remote computing system and available for synchronization. At the client computing device 110, the new folder stubs 850 are stored in the "Home:\Flag Football 20101202" path as illustrated by the current path information 810, and the synchronization scope is expanded to include the path "Home:\Flag Football 20101202".

Continuing with this particular example, the user may then select one of the new folder stubs 850. Here, the user selects the folder stub 850A entitled "Fun Pictures.cloudfx". As a result and with reference to FIG. 9D, file stubs and folder stubs referencing content of the "Fun Pictures" folder stored at the remote computing system 130 are acquired. In this particular example, the "Fun Pictures" folder at the remote computing system 130 includes three files, and thus three file stubs 852 referencing those three files are acquired, stored in the "H:\Home\Flag Football 20101202\Fun Pictures|" path 810, and displayed to the user. The user may then choose to synchronize none, one or more of these files. In this particular example and with reference to FIG. 9E, the user selects file stub 852A that references a file entitled "Alex-purdue.JPG". As a result, that file is acquired, synchronized, and displayed to the user in a pop-up window 860 as illustrated in FIG. 9E. Further, an icon indicating file stub 852A is replaced with an icon 854 indicating that the file is now synchronized and, in some embodiments, indicating the type of file.

One skilled in the art would recognize that there are various ways to communicate to the user that a particular file or folder is a stub or a synchronized file or folder. For example, with reference to FIGS. 8A and 8B, icons associated with the file stub 824 and the synchronized file 826 may be different and representative of whether the file is a file stub or a synchronized file. Additionally or alternatively, the displayed file name could be different based on whether the file is a stub or synchronized file. For example, the file stub 824 may include the extension ".cloudx", whereas such an extension is removed for the synchronized file 826. Similarly, with reference to FIGS. 9A and 9B, icons associated with the folder stub 822A and the synchronized folder 828 may be different and representative of whether the folder is a folder stub or a synchronized folder. Additionally or alternatively, the displayed folder name could be different based on whether the folder is a stub or synchronized folder. For example, the folder stub 822A may include the extension ".cloudfx", whereas such an extension is removed for the synchronized folder 828. In some cases, the extension could be the different for file stubs and folder stubs, such as ".cloudx" for a file stub and ".cloudfx" for a folder stub. In other cases, however, the extension could be the same.

It should be appreciated that all of the operations shown in FIG. 2 and discussed with reference thereto are not necessary, and some embodiments include sequences of operations in which one or more of the operations are omitted. For example, in one embodiment, the files and/or folders selected by the user for synchronization are not automatically opened in response to the user selection of the file stubs. Rather, the user may need to perform an additional selection or other operation to access the file contents. It should also be appreciated that the specific operations illustrated in FIG. 2 provide a particular sequence of operations that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 2 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 3:
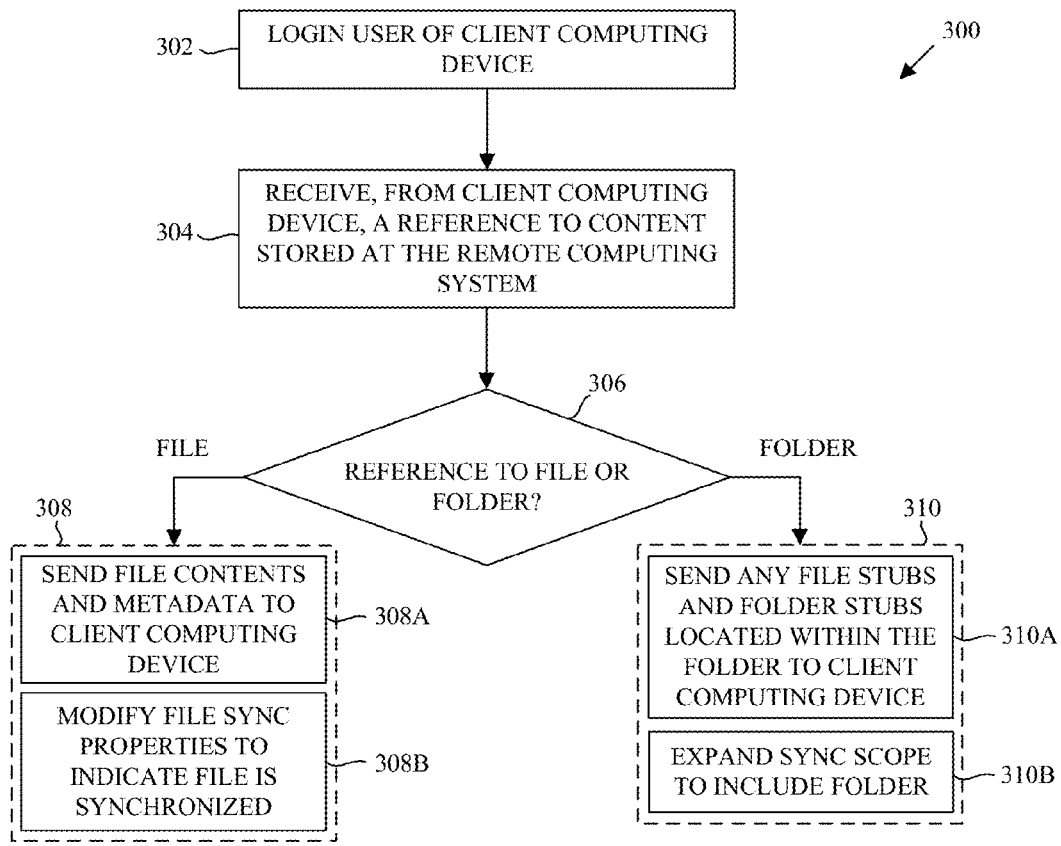
FIG. 3 is a flowchart depicting example operations for expanding the scope of data synchronization at a remote computing system according to a first embodiment.

FIG. 3 is a flowchart depicting example operations for expanding the scope of data synchronization at a remote computing system according to a first embodiment. The operations 300 are described with reference to one or more of FIGS. 1 and 8A through 11, however it should be recognized that embodiments are not necessarily so limited to the specific computing devices described with reference to FIG. 1, the specific graphical interfaces illustrates in FIGS. 8A through 10E, nor the specific synchronization maps illustrated in FIG. 11.

In operation 302 the remote computing system 130 logs in a user of the client computing device 110. The remote computing system 130 may hold accounts for different users and store data for different users in multi-user environments, whereby a user may login to the remote computing system 130 and access data held by the remote computing system 130 on behalf of the user for synchronization purposes. In the case of logging into an account, the user may enter a name and/or password and/or perform additional or alternative authentication processes as known in the art. In other embodiments, a user may not need to log into an account managed by the remote computing system. For example, in some multi-user environments authentication procedures may be performed by one or more entities other than the remote computing system 130, or authentication procedures may not be performed at all. Yet, in some embodiments, multiple users at one or more client computing devices may be capable of accessing or otherwise synchronizing data on their device with data stored by the remote computing system 130. In yet other embodiments, the remote computing system 130 may simply be another electronic device owned or otherwise associated by the user of the client computing device, such as a desktop computer or NAS drive. In such instances, the user may or may not need to perform a login procedure.

In operation 304, the remote computing system 130 receives, from the client device 110, e.g., via communication interface 132, a reference to content stored at the remote computing system, where the reference is generated from a stub at the client computing device and in response to a user selection of the stub. For example, with reference to FIG. 8A, the remote computing system 130 may receive a request to synchronize one or more of the folders referenced by the folder stubs 822, or for the file referenced by file stub 824, where the request includes a reference or location pointer to the content desired to be synchronized. In operation 306, the remote computing system 130 may determine whether the reference is either a reference to a file stored at the remote computing system or a folder stored at the remote computing system. For example, if the user selects a file stub, the client computing device 110 may communicate a request to synchronize the file referenced by the file stub to the remote computing system 130. If the user selects a folder stub, the client computing device 110 may communicate a request to synchronize the folder referenced by the file folder stub to the remote computing system 130.

If the remote computing system 130 determines that the received reference is to a file, i.e., that the user selected a file stub, processing may continue with operation 308 where the remote computing system 130 synchronizes the file referenced by the file stub between the client computing device 110 and the remote computing system 130. In synchronizing the file, one or more of a variety of operations may be performed. For example, in operation 308A, the file contents referenced by the file stub and/or file metadata associated with the file contents may be sent to the client device 110 from the remote computing system 130. Such data may be communicated, e.g., via communication interfaces 112 and 132. In operation 308B, file synchronization properties associated with the file content may be modified to indicate that the file is synchronized. Such file synchronization properties may be stored in the associated file metadata or other suitable location, and may be referenced by the processor 134 of remote computing system 130 at various times (e.g., upon establishing a connection between the client computing device 110 and the remote computing system 130) when determining which files stored at remote computing system 130 are supposed to be maintained in a state of synchronization with corresponding files located at the client computing device 120. For example, turning briefly to FIGS. 8A and 8B, in response to the user selecting the file stub 824 ("Android2.txt.cloudx"), the remote computing system 130 may identify the file referenced by the file stub 824 and stored at the remote computing system 130, send the contents of the file referenced by the file stub 824 to the client computing device 110, which in this case are the contents and metadata of a text file entitled "Android2.txt", and modify the file synchronization properties associated with the file to indicate that the file is synchronized.

On the other hand, if the remote computing system 130 determines that the received reference is to a folder, i.e., that the user selected a folder stub, processing may continue with operation 310 where the remote computing system 130 synchronizes the folder referenced by the folder stub between the client computing device 110 and the remote computing system 130. In synchronizing the folder, one or more of a variety of operations may be performed. For example, in operation 310A, the remote computing system 130 may send, to the client computing device 110, file stubs and/or folder stubs that reference actual files and folders stored within the folder at the remote computing system 130. In some embodiments, the actual file stubs and/or folder stubs may not be sent per se, but rather metadata or other information operable to define such stubs may be sent to the client device, and the client device may then generate the file stubs and/or folder stubs itself. Such data may be communicated, e.g., via communication interfaces 112 and 132. In operation 310B, the synchronization scope is expanded to include the folder selected by the user. In expanding the synchronization scope, information representing the scope of synchronization, such as synchronization map 136D, may be modified to include the path to the selected folder. Such a map may be stored at the remote computing system 130 or other suitable location, and may be referenced by the processor 134 of the remote computing system 130 at various times (e.g., upon establishing a connection between the client computing device 110 and the remote computing system 130) when determining which folders stored at the remote computing system 130 are supposed to be maintained in a state of synchronization with a corresponding folder located at the client computing device 110.

For example, turning briefly to FIGS. 9A to 9C, FIGS. 9A to 9C illustrate a graphical user interface implemented to expand the scope of data synchronization according to an embodiment. FIG. 9A illustrates a graphical user interface 900 similar to the graphical user interface 800 described with reference to FIG. 8B, where a number of folder stubs 822 and a synchronized file 826 are provided in the home directory illustrated by the current path information 810. In this particular example, the client computing device 110 receives a user selection of the folder stub 822A entitled "Flag Football 20101202.cloudfx". In response to the user selection and as illustrated in FIG. 9B, the remote computing system 130 sends, to the client computing device 110, file stubs and/or folder stubs that reference actual files or sub-folders stored in the "Flag Football 20101202" folder at the remote computing system 130. In this particular example, the "Flag Football 20101202" folder at the remote computing system includes three additional folders. Accordingly, stub folders for those folders are communicated to the client device and displayed to the user as illustrated in FIG. 9C. Further, the synchronization scope is expanded to include the path "Home:\Flag Football 20101202". In this particular example, after double-clicking the stub folder 822A as illustrated in FIG. 9A, the synchronized folder 828 is displayed as illustrated in FIG. 9B, and in response to a user selection of the synchronized folder 828, the contents thereof are displayed as illustrated in FIG. 9C. However, in other embodiments, after double-clicking the stub folder 822A as illustrated in FIG. 9A, the contents of the synchronized folder 828 as illustrated in FIG. 9C can be automatically and immediately displayed to the user.

It should be appreciated that all of the operations shown in FIG. 3 and discussed with reference thereto are not necessary, and some embodiments include sequences of operations in which one or more of the operations are omitted. It should also be appreciated that the specific operations illustrated in FIG. 3 provide a particular sequence of operations that may be executed by a remote computing system, according to certain embodiments of the present invention. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 4:
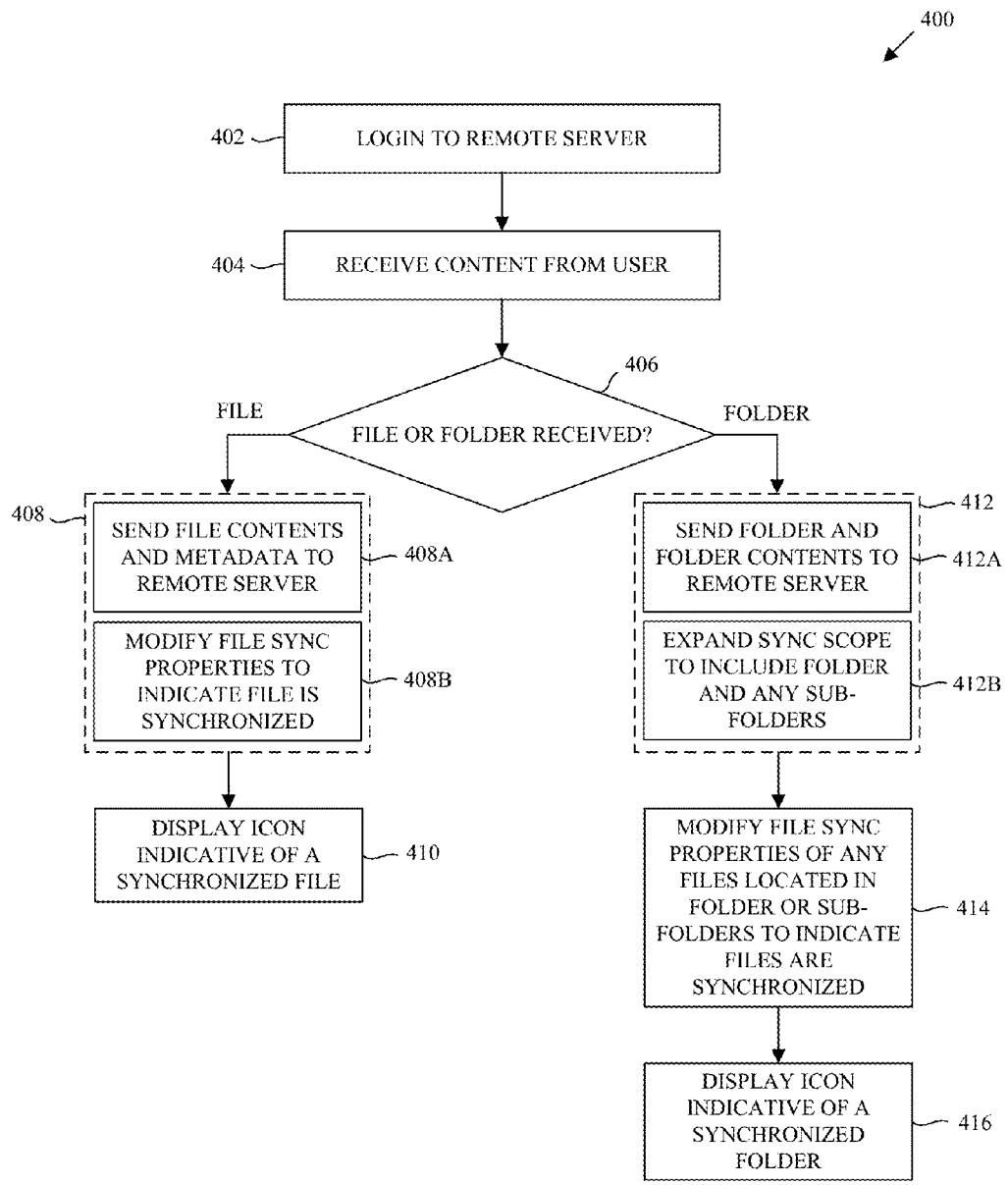
FIG. 4 is a flowchart depicting example operations for expanding the scope of data synchronization at a client computing device according to a second embodiment.

FIG. 4 is a flowchart depicting example operations 400 for expanding the scope of data synchronization at a client computing device according to a second embodiment. The operations 400 are described with reference to one or more of FIGS. 1 and 8A through 11, however it should be recognized that embodiments are not necessarily so limited to the specific computing devices described with reference to FIG. 1, the specific graphical interfaces illustrates in FIGS. 8A through 10E, nor the specific synchronization maps illustrated in FIG. 11.

In operation 402 a user may login or otherwise establish a connection with a remote server. This operation is similar to operation 202 described with reference to FIG. 2, thus further description is unnecessary.

In operation 404 the client computing device 110 receives content from the user. Depending on the particular implementation, the client computing device 110 may receive content using one or more of a variety of techniques. For example, in some embodiments the synchronization capabilities described herein may be implemented directly by the operating system of the client computing device 110. Thus, the entire file system of the client computing device 110 may be capable of being synchronized with the remote computing system 130. In such an implementation, the file system may receive content from the user by copying or moving data from another device to the client computing device 110. For example, if the client computing device 110 is a tablet, a USB flash drive could be coupled to the communication interface 112, and files and/or folders copied or moved from the flash drive to the tablet. For another example, the client computing device 110 could receive files and/or folders via other wired or wireless connections to another device. Additionally or alternatively, the client computing device 110 may receive content from the user as a result of the user generating content on the client computing device 110 via one or more applications executed by the client computing device 110. For example, the client computing device 110 may have stored thereon a word processing application. The user may thus create a new file via the word processing application.

In operation 406, the client computing device 110 may determine whether a file or a folder is received. If a file is received, processing may continue to operation 408. In operation 408, the file is synchronized between the client computing device 110 and the remote computing system 130. In synchronizing the file, one or more of a variety of operations may be performed. For example, in operation 408A the contents of the file and/or metadata associated with the file may be sent to the remote computing system 130. Such data may be communicated, e.g., via communication interfaces 112 and 132. In operation 408B, file synchronization properties associated with the file content may be modified to indicate that the file is synchronized. This operation is similar to operation 218B described with reference to FIG. 2. In operation 410, an icon indicating that the file is synchronized is displayed to the user. For example, turning briefly to FIG. 8B, in one particular embodiment the file 826 entitled "Android2.txt" may be copied or moved to the client computing device 110 from another computing device, or generated by a word processing application at the client computing device 110. In response to the file being received or generated by the client computing device 110, the contents of the "Android2.txt" and metadata associated with the file are sent to the remote computing system 130, the synchronization properties associated with the file are modified to indicate that the file is synchronized, and an icon is displayed, as illustrated in FIG. 8B, indicating that the file is synchronized.

On the other hand, if a folder is received, processing may continue to operation 412. In operation 412, the folder is synchronized between the client computing device 110 and the remote computing system 130. In synchronizing the folder, one or more of a variety of operations may be performed. For example, in operation 412A the folder, any contents of the folder, and any metadata associated with the folder may be sent to the remote computing system 130. In sending the contents of the folder, the folder, files located in the folder, as well as any additional sub-folders located in the folder as well as their contents, may be sent to the remote computing system 130. Such data may be communicated, e.g., via communication interfaces 112 and 132. In operation 412B, the synchronization scope is expanded to include the folder as well as any hierarchy of sub-folders located within the folder. For example, the synchronization map 116F may be modified to include paths to the folder and any hierarchy of sub-folders located within the folder. Separate from or as part of the folder synchronization operation 412, in operation 414 the file synchronization properties of any files located in the folder or sub-folders may be modified to indicate that the files are synchronized, and in operation 416 an icon may be displayed that indicates to the user that the folder is synchronized.

Figure 9D:
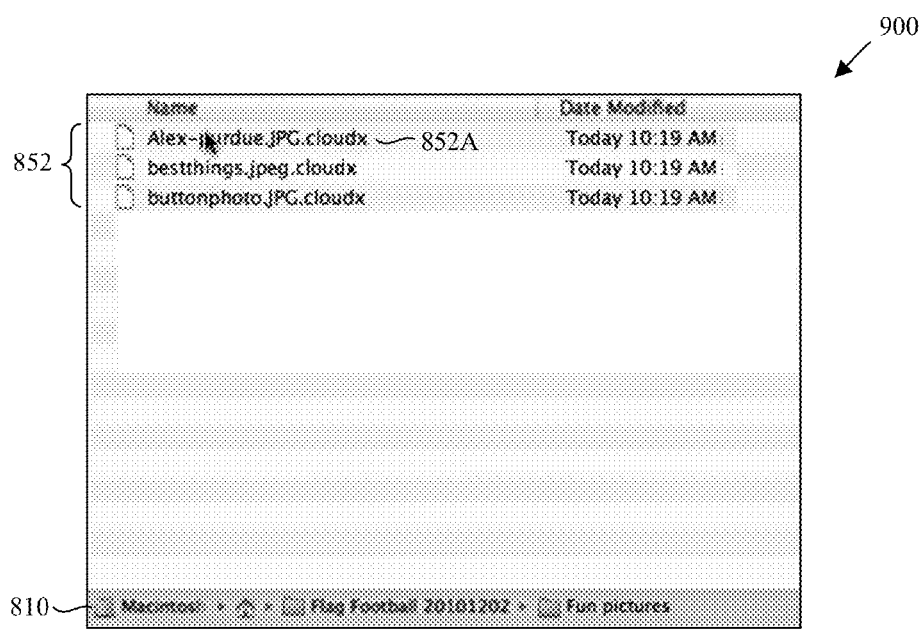
Figure 9E:
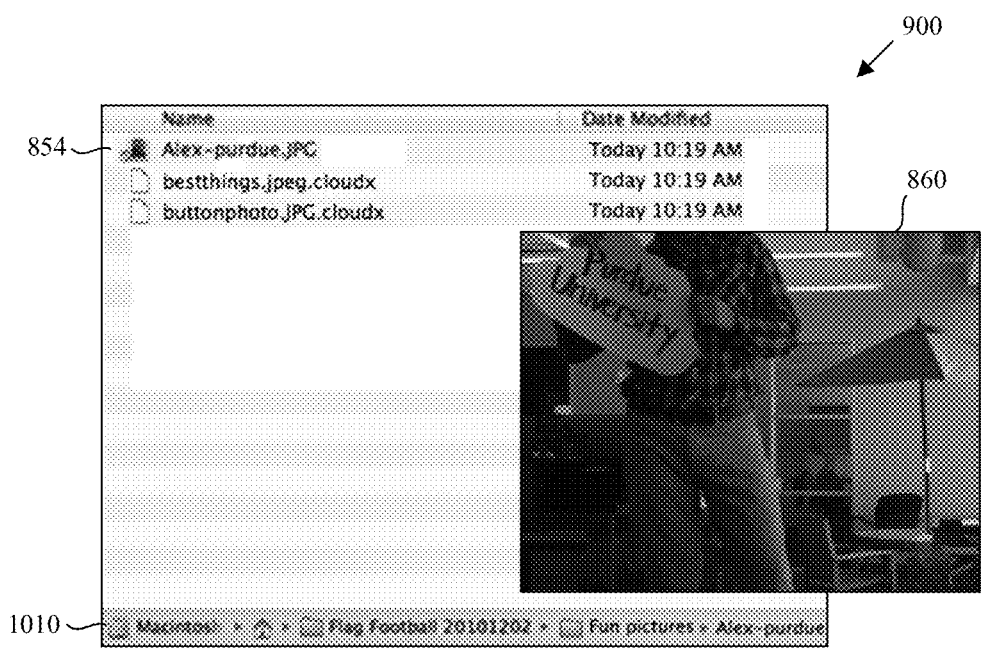

For example, with reference to FIGS. 9B through 9D, presume that the folder "Flag Football 20101202" is not initially synchronized nor located at the remote computing system 130. Further, the folder "Flag Football 20101202" includes the three sub-folders illustrated in FIG. 9C (although the folders are actual folders at the client computing device, and not stub folders as illustrated in FIG. 9C and not located the remote computing system 130), and the sub-folder "Fun pictures" includes the three images illustrated in FIG. 9D (again, the actual image files are provided at the client computing device, and not stub files). In response to the client computing device 110 receiving the "Flag Football 20101202" folder, e.g., from a connected USB drive, the "Flag Football 20101202" folder is synchronized with the remote computing system 130, where that folder and the contents of that folder (e.g., the three subfolders and three image files) are all sent to the remote computing system 130 and indicated as being synchronized. Further, the synchronization scope would be expanded to include "Flag Football 20101202" as well as the three sub-folders illustrated in FIG. 9C.

It should be appreciated that all of the operations shown in FIG. 4 and discussed with reference thereto are not necessary, and some embodiments include sequences of operations in which one or more of the operations are omitted. It should also be appreciated that the specific operations illustrated in FIG. 4 provide a particular sequence of operations that may be executed by a remote computing system, according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 5:
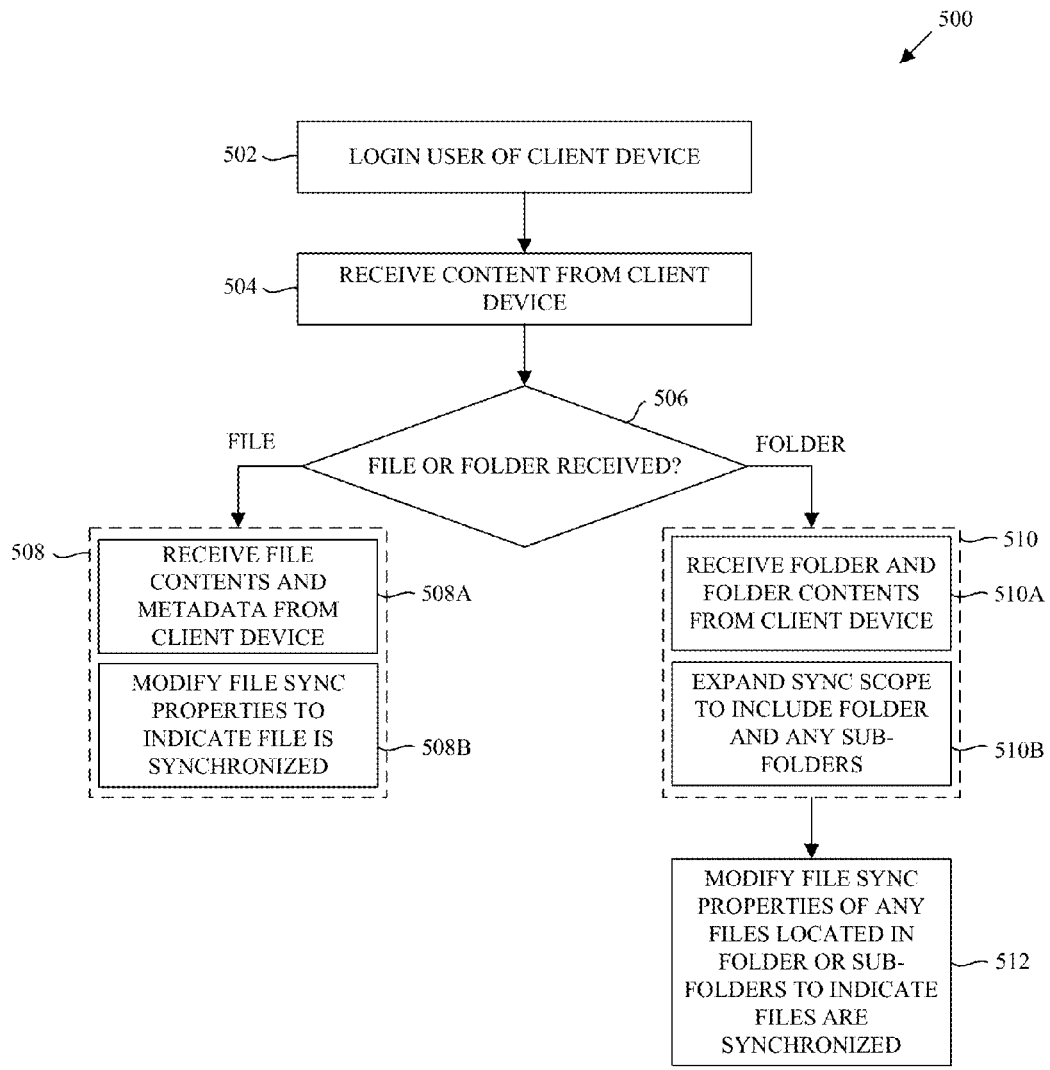
FIG. 5 is a flowchart depicting example operations for expanding the scope of data synchronization at a remote computing system according to a second embodiment.

FIG. 5 is a flowchart depicting example operations 500 for expanding the scope of data synchronization at a remote computing system according to a second embodiment. The operations 500 are described with reference to one or more of FIGS. 1 and 8A through 11, however it should be recognized that embodiments are not necessarily so limited to the specific computing devices described with reference to FIG. 1, the specific graphical interfaces illustrates in FIGS. 8A through 10E, nor the specific synchronization maps illustrated in FIG. 11.

In operation 502 the remote computing system 130 logs in a user of the client computing device 110. This operation is similar to operation 302 described with reference to FIG. 3, thus further description is unnecessary.

In operation 504 the remote computing system 130 receives content from the client device. Depending on the particular implementation, the remote computing system 130 may receive content using one or more of a variety of techniques. For example, the user of the client computing device 110 can cause files or folders either generated by or acquired at the client computing device 110 to be communicated to the remote computing system 130. Such files or folders may be communicated, e.g., via communication interfaces 112 and 132. In another example, the remote computing system 130 or another computing system separate from the client computing device 110 may be operable to generate or acquire files or folders. For example, application software such as word processing software may by executed by the remote computing system 130. In response to the user generating a file or folder via the application software, the remote computing system 130 may generate or otherwise receive the file or folder on behalf of the user.

In operation 506, the remote computing system 130 may determine whether a file or a folder is received. If a file is received, processing may continue to operation 508. In operation 508, the file is synchronized between the client computing device 110 and the remote computing system 130. In synchronizing the file, one or more of a variety of operations may be performed. For example, in operation 508A the file contents and metadata are received from the client computing device 110 (or, in some embodiments, from a separate application executing on the remote computing system 130 or from a computing device other than the remote computing system 130 or client computing device 110). Such data may be communicated, e.g., via communication interfaces 112 and 132. In operation 508B, file synchronization properties associated with the file content may be modified to indicate that the file is synchronized. This operation is similar to operation 308B described with reference to FIG. 3.

On the other hand, if a folder is received, processing may continue to operation 510. In operation 510, the folder is synchronized between the client computing device 110 and the remote computing system 130. In synchronizing the folder, one or more of a variety of operations may be performed. For example, in operation 510A the folder, any contents of the folder, and any metadata associated with the folder may be received by the remote computing system 130. In receiving the contents of the folder, the folder, files located in the folder, as well as any additional sub-folders located in the folder as well as their contents, may be received by the remote computing system 130. Such data may be communicated, e.g., via communication interfaces 112 and 132. In operation 510B, the synchronization scope is expanded to include the folder as well as any hierarchy of sub-folders located within the folder. For example, the synchronization map 136D may be modified to include paths to the folder and any hierarchy of sub-folders located within the folder. Separate from or as part of the folder synchronization operation 510, in operation 512 the file synchronization properties of any files located in the folder or sub-folders may be modified to indicate that the files are synchronized.

For example, with reference to FIGS. 9B through 9D, presume that the folder "Flag Football 20101202" is not initially synchronized nor located at the remote computing system 130. Further, the folder "Flag Football 20101202" includes the three sub-folders illustrated in FIG. 9C (although the folders are actual folders at the client computing device, and not stub folders as illustrated in FIG. 9C and not located the remote computing system 130), and the sub-folder "Fun pictures" includes the three images illustrated in FIG. 9D (again, the actual image files are provided at the client computing device, and not stub files). In response to the remote computing system 130 receiving the "Flag Football 20101202" folder, e.g., from the client computing device 110, the "Flag Football 20101202" folder is synchronized with the client computing device 110, where that folder and the contents of that folder (e.g., the three subfolders and three image files) are all received by the remote computing system 130. Further, the synchronization scope would be expanded to include "Flag Football 20101202" as well as the three sub-folders illustrated in FIG. 9C.

It should be appreciated that all of the operations shown in FIG. 5 and discussed with reference thereto are not necessary, and some embodiments include sequences of operations in which one or more of the operations are omitted. It should also be appreciated that the specific operations illustrated in FIG. 5 provide a particular sequence of operations that may be executed by a remote computing system, according to certain embodiments of the present invention. Other sequences of operations may also be performed according to alternative embodiments. For example, alternative embodiments of the present invention may perform the operations outlined above in a different order. Moreover, the individual operations illustrated in FIG. 5 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 6:
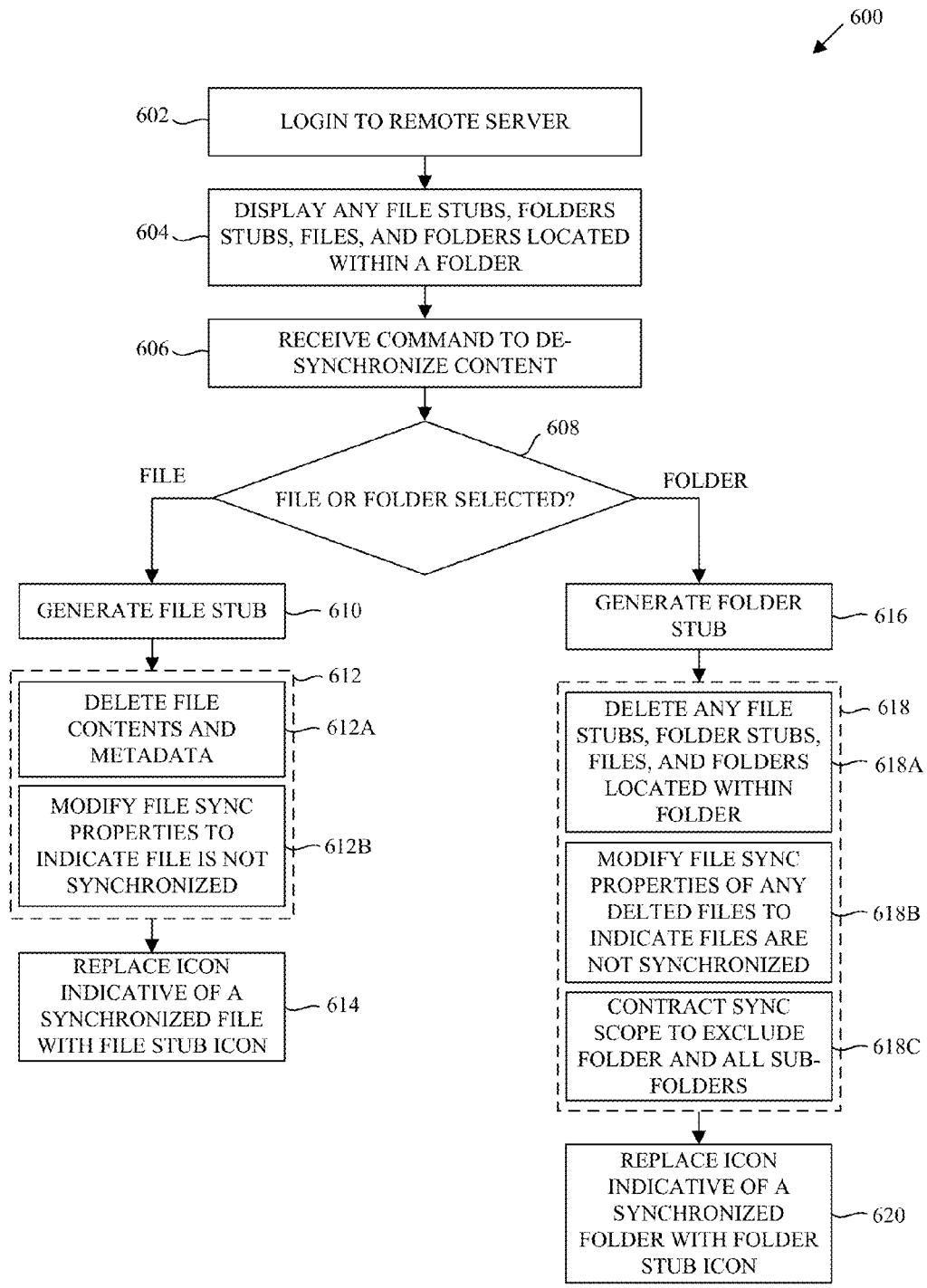
FIG. 6 is a flowchart depicting example operations for contracting the scope of data synchronization at a client computing device according to an embodiment.

FIG. 6 is a flowchart depicting example operations 600 for contracting the scope of data synchronization at a client computing device according to an embodiment. The operations 600 are described with reference to one or more of FIGS. 1 and 8A through 11, however it should be recognized that embodiments are not necessarily so limited to the specific computing devices described with reference to FIG. 1, the specific graphical interfaces illustrates in FIGS. 8A through 10E, nor the specific synchronization maps illustrated in FIG. 11.

In operation 602 a user may login or otherwise establish a connection with a remote server. This operation is similar to operation 202 described with reference to FIG. 2, thus further description is omitted.

Figure 10A:
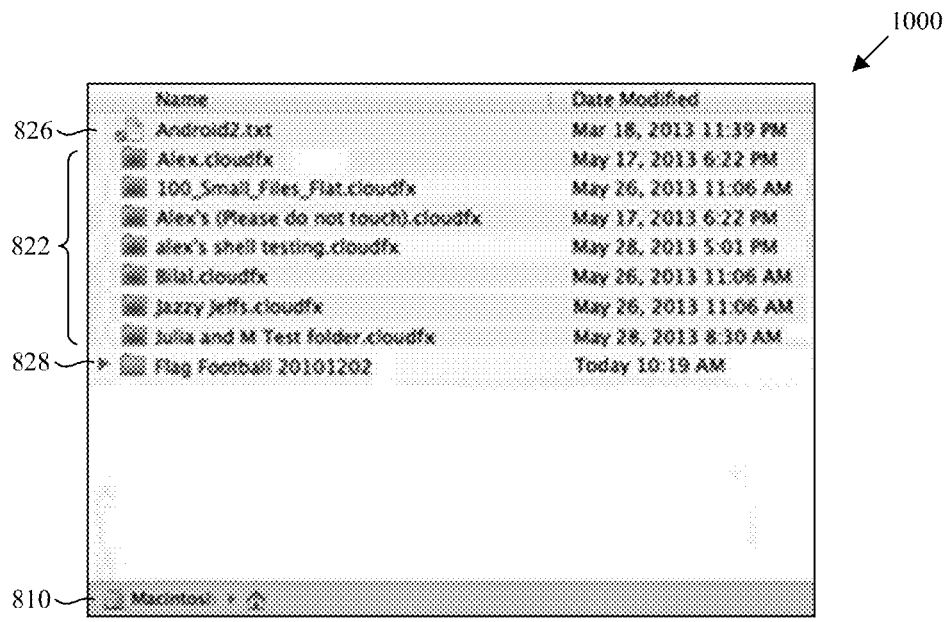
FIGS. 10A-10E illustrate a graphical user interface implemented to contract the scope of data synchronization according to an embodiment.

In operation 604, any file stubs, folder stubs, files, and folders located within a folder are displayed to the user, e.g., via user interface 118. That is, any synchronized files and folders may be displayed to the user, as well as any file stubs and folder stubs referencing content that is stored at remote computing system 130 and available for synchronization. For example, FIG. 10A illustrates a graphical user interface 1000 similar to the graphical user interface 900 described with reference to FIG. 9B. In this particular example, presume that the synchronization operations described with reference to FIG. 2 and FIGS. 9A through 9E have been performed. As a result, the synchronization scope includes the home folder, the "Flag Football 20101202" sub-folder, and the "Flag Football 20101202\Fun pictures" sub-folder. As well, the files "Android2.txt" and "Alex-purdue.JPG" are synchronized. Accordingly, in this particular example and as illustrated in FIG. 10A, from the home folder as illustrated by the current path information 810, the folder stubs 822, synchronized file 826, and synchronized folder 828 are displayed to the user.

In operation 606, the client computing device 110 receives, e.g., via user interface 118, a command to de-synchronize content. For example, turning briefly to FIG. 10B, a user may provide a command to the client computing device to de-synchronize any of the synchronized content available within the home directory. While the command may be communicated via one or more of a variety of techniques, such as by touching a screen of the device, selecting an icon with a mouse or other user interface device, providing a voice or cognitive communication, in this particular example a user right-clicks on one of the graphical representations of synchronized content illustrated in the graphical user interface

1000. Depending on the particular contents of the folder being displayed to the user, the user may command the client computing device to de-synchronize different types of content, such as a synchronized file or a synchronized folder. In this particular example, the user commands the client computing device to de-synchronize file 826 entitled "Android2.txt" by right-clicking on the graphical representation of the file 826 and selecting an "unsynchronize" option in the context menu 1002 that is displayed in response to the right-clicking on the graphical representation of the file 826.

Returning to FIG. 6, in operation 608 the client computing device 110 then determines what type of data the user selected to de-synchronize. For example, whether the user selected to de-synchronize a file or a folder. If it is determined that the user selected a file to de-synchronize, then processing may continue to operation 610. In operation 610, the client computing device generates a file stub that references the location of the de-synchronized file at the remote computing system 130. In one embodiment, the client computing device 110 may generate the file stub from information already available at the client computing device 110, such as file metadata for that file. In other embodiments, the client computing device 110 may acquire information (e.g., the reference location) from the remote computing system 130 to be used in generating the file stub. In yet other embodiments, the client computing device 110 may acquire the file stub itself from another computing device, such as the remote computing system 130.

In operation 612 the selected file is de-synchronized. In de-synchronizing the file, one or more of a variety of operations may be performed. For example, in operation 612A, the file contents and/or file metadata associated with the file may be deleted from the client device 110. In operation 612B, file synchronization properties associated with the file may be modified to indicate that the file is not synchronized. Such file synchronization properties may be stored in the file stub or other suitable location, and may be referenced by the processor 114 of client computing device 110 at various times (e.g., upon power-up, upon execution of a synchronization application, etc.) when determining which files stored at client computing device 110 are supposed to be maintained in a state of synchronization with a corresponding file located at the remote computing system 130. Separate from or as part of the file de-synchronization operation 612, in operation 614 the icon (or other representation) of a synchronized file is replaced with the generated file stub icon or other graphical, audible, or other representation of the file stub.

Figure 10B:
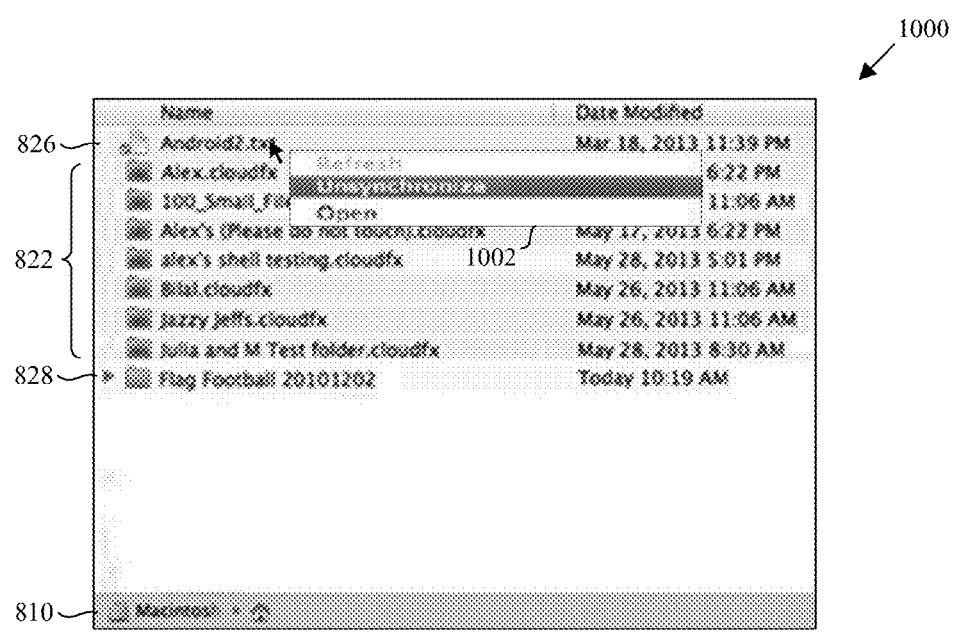
Figure 10C:

For example, turning briefly to FIGS. 10A through 10C, in response to the user commanding the client computing device 110 to de-synchronize the synchronized file 826 via context menu 1002, the client computing device 110 may generate a file stub referencing the location of the "Android2.txt" file at the remote computing system 130, and delete the contents of the file 826, which in this case are the contents and metadata of the text file entitled "Android2.txt" stored at the client computing device 110. The graphical user interface 1000 replaces the icon indicating that the file is synchronized 826 with the icon of the stub file 824, as shown in FIG. 10C, and modifies the file synchronization properties associated with that file to indicate that the file is not synchronized.

Returning to FIG. 6, in operation 608 the client computing device 110 may determine that a folder was selected by the user for de-synchronization. If so, then processing may continue to operation 616 where the computing device generates a folder stub that references the location of the de-synchronized folder at the remote computing system 130. In one embodiment, the client computing device 110 may generate the folder stub from information already available at the client computing device 110, such as folder metadata for that folder. In other embodiments, the client computing device 110 may acquire information (e.g., the reference location) from the remote computing system 130 to be used in generating the folder stub. In yet other embodiments, the client computing device 110 may acquire the folder stub itself from another computing device, such as the remote computing system 130.

Processing may then continue to operation 618 where the folder selected by the user is de-synchronized between the client device 110 and the remote computing system 130. In de-synchronizing the folder, one or more of a variety of operations may be performed. For example, in operation 618A, any files, folders, file stubs and/or folder stubs located within the selected folder at the client computing device 110 may be deleted from the client computing device 110. In operation 618B, the file synchronization properties of any deleted files are modified to indicate that the files are not synchronized any more. In operation 618C, the synchronization scope is expanded to exclude the selected folder and all sub-folders of the selected folder. In contracting the synchronization scope, information representing the scope of synchronization, such as synchronization map 116F, may be modified to exclude the path to the selected folder and its hierarchy of sub-folders. Such a map may be stored at the client computing device 110 or other suitable location, and may be referenced by the processor 114 of client computing device 110 at various times (e.g., upon power-up, upon execution of a synchronization application, etc.) when determining which folders stored at client computing device 110 are supposed to be maintained in a state of synchronization with a corresponding folder located at the remote computing system 130. Separate from or as part of the folder de-synchronization operation 618, in operation 620 an icon (or other representation) of the selected synchronized folder may be replaced with the generated folder stub icon or other graphical, audible, or other representation of the folder stub.

Figure 10D:
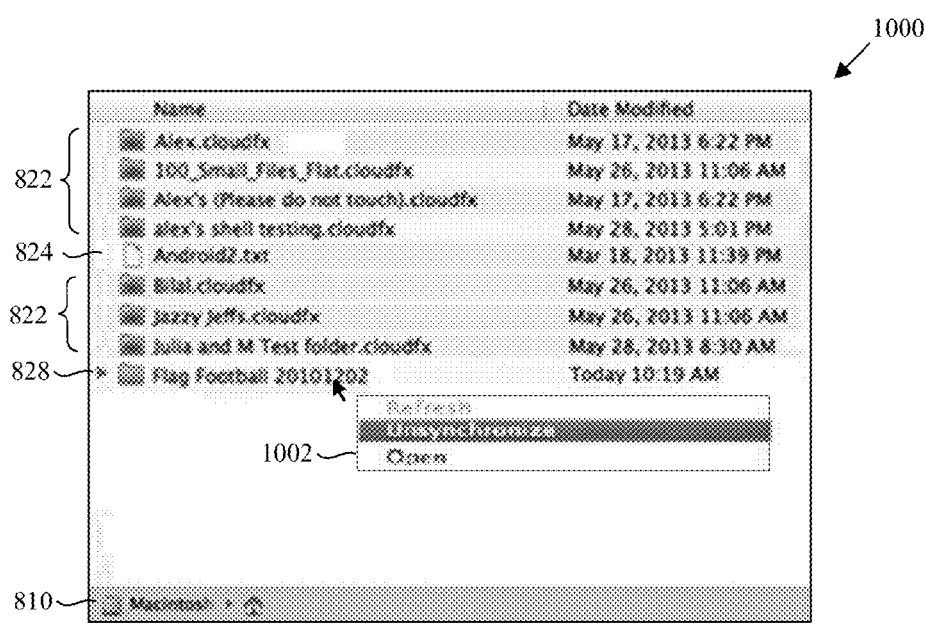
Figure 10E:
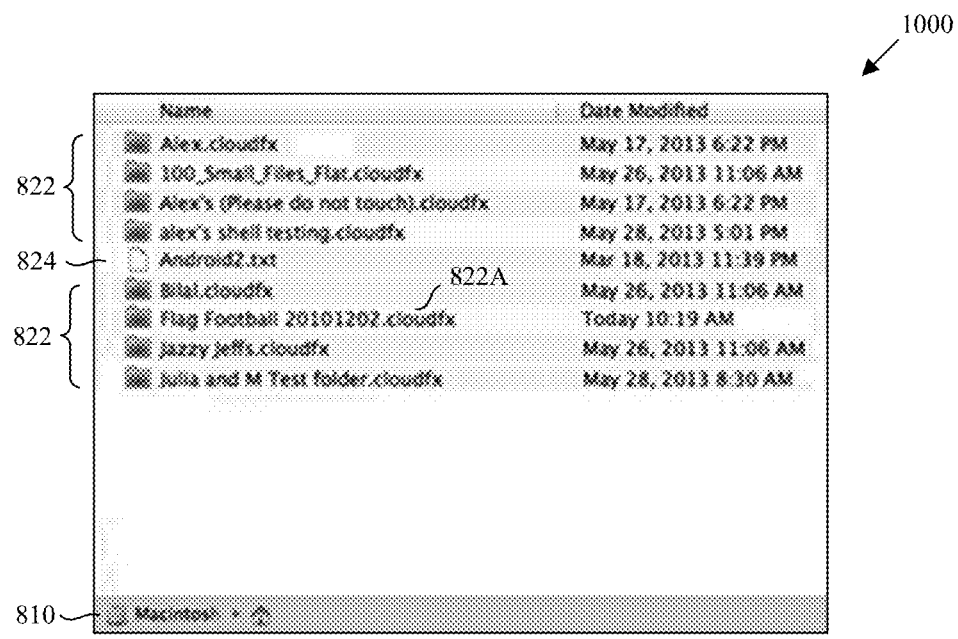

For example, turning briefly to FIGS. 10D and 10E, FIG. 10D illustrates a graphical user interface 1000 similar to the graphical user interface 1000 described with reference to FIG. 10C. In this particular example, in response to the user commanding the client computing device 110 to de-synchronize the synchronized folder 828 via context menu 1002, the client computing device 110 may generate a folder stub referencing the location of the "Flag Football 20101202" folder at the remote computing system 130, and delete the contents of the folder 828, which in this case are stub folders "alex stepped on john.cloudfx" and "john-was-here.cloudfx", as well as the sub-folder "Fun pictures" which were in the "Flag Football 20101202" folder, as well as the file "Alex-purdue.JPG" and file stubs "bestthings.jpg.cloudx" and "buttonphoto.JPG.cloudx" which were in the "Fun pictures" sub-sub-folder. Further, the graphical user interface 1000 replaces the icon indicating that the folder is synchronized 828 with the icon of the stub folder 822A, as illustrated in FIG. 10E, modifies the file synchronization properties of the file "Alex-purdue.JPG" to indicate that the file is not synchronized, and contracts the synchronization scope to exclude the path "Home:\Flag Football 20101202" and all sub-paths within that path (i.e., "Home:\Flag Football 20101202\Fun pictures\").

It should be appreciated that all of the operations shown in FIG. 6 and discussed with reference thereto are not necessary, and some embodiments include sequences of operations in which one or more of the operations are omitted. It should also be appreciated that the specific operations illustrated in FIG. 6 provide a particular sequence of operations that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 6 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 7:
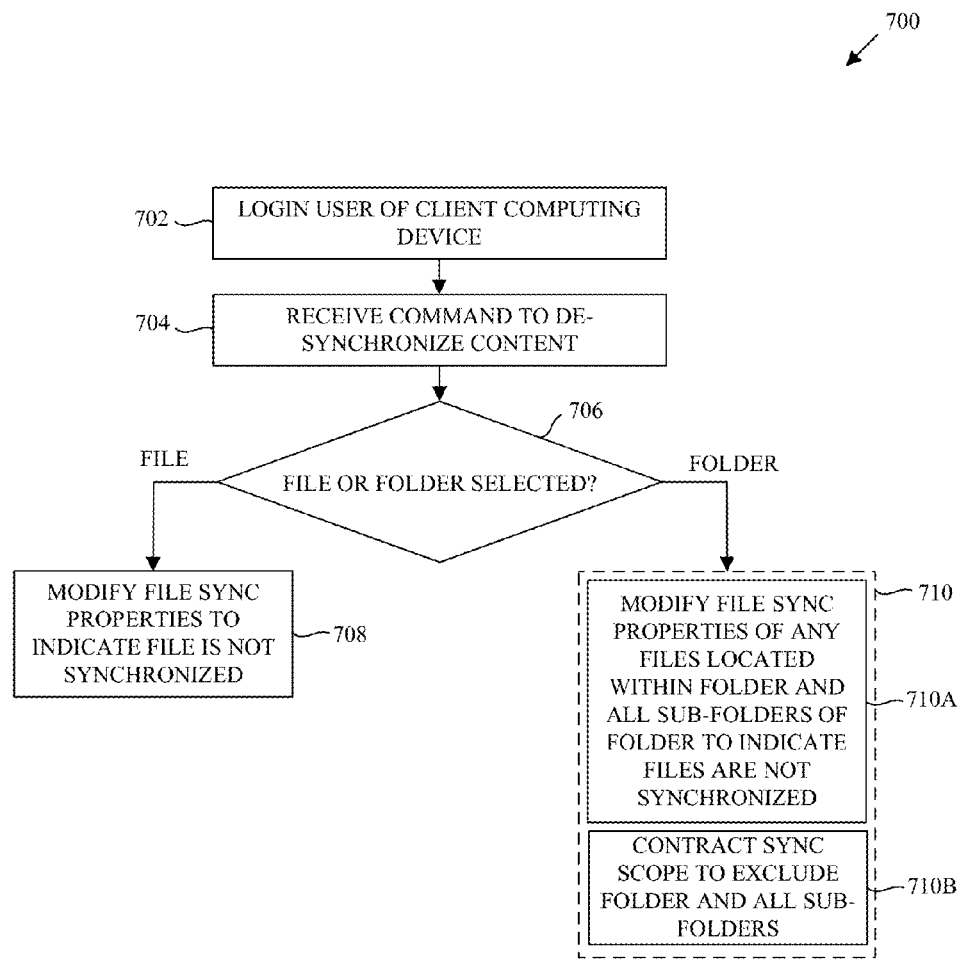
FIG. 7 is a flowchart depicting example operations for contracting the scope of data synchronization at a remote computing system according to an embodiment.

FIG. 7 is a flowchart depicting example operations for contracting the scope of data synchronization at a remote computing system according to an embodiment. The operations 700 are described with reference to one or more of FIGS. 1 and 8A through 11, however it should be recognized that embodiments are not necessarily so limited to the specific computing devices described with reference to FIG. 1, the specific graphical interfaces illustrates in FIGS. 8A through 10E, nor the specific synchronization maps illustrated in FIG. 11.

In operation 702 the remote computing system 130 logs in a user of the client computing device 110. This operation is similar to operation 302 described with reference to FIG. 3, thus further description is omitted.

In operation 704, the remote computing system 130 receives, from the client device 110, e.g., via communication interface 132, a command to de-synchronize content. For example, with reference to FIG. 10B, the remote computing system 130 may receive a command to de-synchronize content sent from the client computing device 110 in response to the user's interaction with context menu 1002. In operation 706, the remote computing system 130 may determine whether the user has selected to de-synchronize either a file or a folder.

If the remote computing system 130 determines that the user selected a file, processing may continue with operation 708 where the remote computing system 130 de-synchronizes the file selected by the user. In de-synchronizing the file, one or more of a variety of operations may be performed. For example, in operation 708, the remote computing system 130 may modify the file synchronization properties associated with the synchronized file to indicate that the file is de-synchronized. Such file synchronization properties may be stored in the associated file metadata or other suitable location, and may be referenced by the processor 134 of remote computing system 130 at various times (e.g., upon establishing a connection between the client computing device 110 and the remote computing system 130) when determining which files stored at remote computing system 130 are supposed to be maintained in a state of synchronization with a corresponding file located at the client computing device 120. For example, turning briefly to FIG. 10B, in response to the user commanding the client computing device 120 to de-synchronize the file 826 ("Android2.txt"), the remote computing system 130 may modify the file synchronization properties associated with that file to indicate that the file is de-synchronized.

On the other hand, if the remote computing system 130 determines that the user selected a folder to de-synchronize, processing may continue with operation 710 where the remote computing system 130 de-synchronizes the folder selected by the user. In de-synchronizing the folder, one or more of a variety of operations may be performed. For example, in operation 710A, the remote computing system 130 may modify the file synchronization properties of any files stored in the selected folder and in any sub-folders of the folder to indicate that those files are de-synchronized. In operation 710B, the synchronization scope is contracted to exclude the folder selected by the user as well as all sub-folders within that folder. In contracting the synchronization scope, information representing the scope of synchronization, such as synchronization map 136D, may be modified to exclude the path to the selected folder and any hierarchy of sub-folders within the selected folder. Such a map may be stored at the remote computing system 130 or other suitable location, and may be referenced by the processor 134 of remote computing system 130 at various times (e.g., upon establishing a connection between the client computing device 110 and the remote computing system 130) when determining which folders stored at remote computing system 130 are supposed to be maintained in a state of synchronization with a corresponding folder located at the client computing device 110.

For example, turning briefly to FIG. 10D, FIG. 10D illustrates a graphical user interface 1000 similar to the graphical user interface 1000 described with reference to FIG. 10C. In this particular example, in response to the user commanding the client computing device 110 to de-synchronize the synchronized folder 828 via context menu 1002, the remote computing system 130 modifies the file synchronization properties of the file "Alex-purdue.JPG" to indicate that the file is not synchronized, and contracts the synchronization scope to exclude the path "Home:\Flag Football 20101202" and all sub-paths within that path (i.e., "Home:\Flag Football 20101202\Fun pictures\").

It should be appreciated that all of the operations shown in FIG. 7 and discussed with reference thereto are not necessary, and some embodiments include sequences of operations in which one or more of the operations are omitted. It should also be appreciated that the specific operations illustrated in FIG. 7 provide a particular sequence of operations that may be executed by a remote computing system, according to certain embodiments of the present invention. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 11:
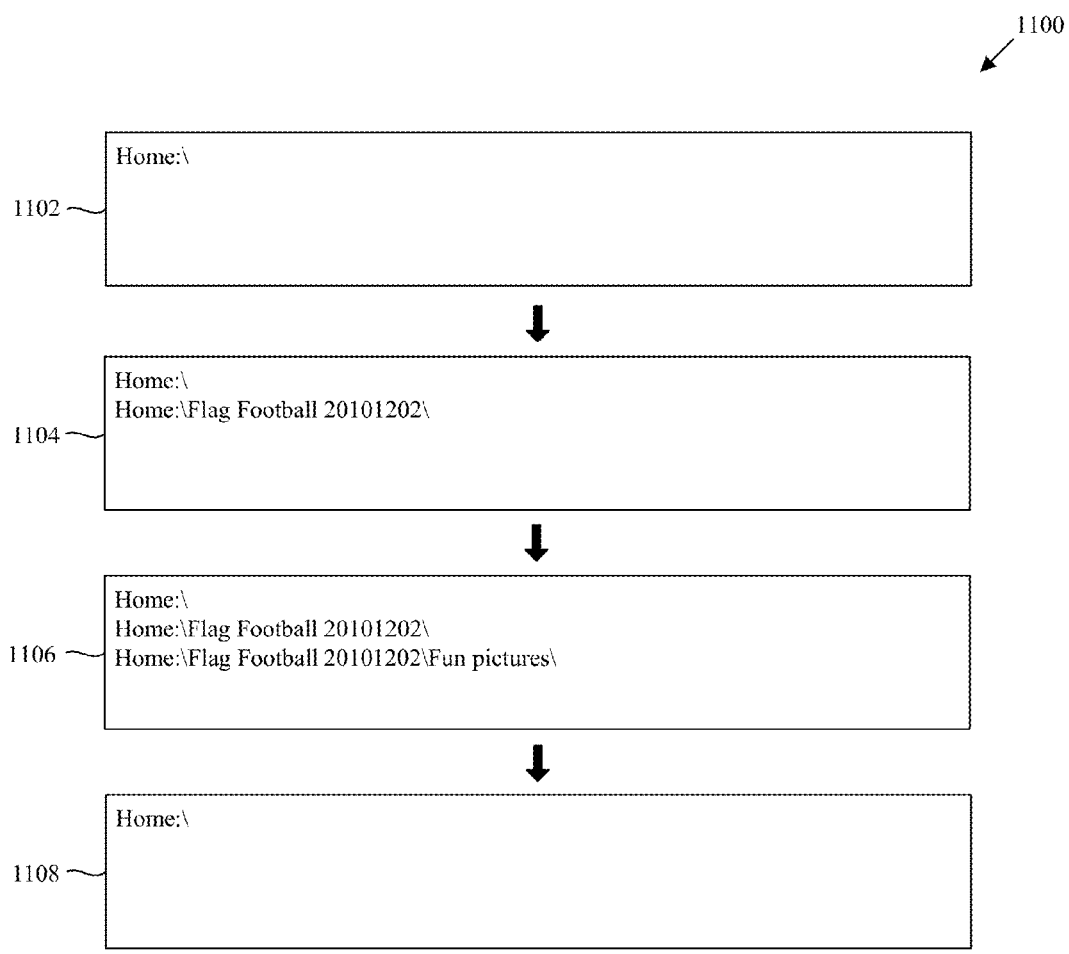
FIG. 11 illustrates a simplified depiction of a synchronization map as it is modified to expand and contract the scope of data synchronization according to an embodiment.

FIG. 11 illustrates a simplified depiction of a synchronization map 1100 as it is modified to expand and contract the scope of data synchronization according to an embodiment. The synchronization map 1100 points to a number of file system paths on the remote computing system 130 that are to be synchronized between the client computing device 110 and the remote computing system 130.

In this particular example, the synchronization map 1102 begins with a reference to a home location or folder within the file system of the remote computing system 130. For example, as described with reference to FIG. 8A, a home folder of the client computing device 110 may be synchronized with a corresponding home folder at the remote computing system 130 assigned to the user. The home folder within the file system of the remote computing system in this particular example is identified with the path "Home:\". At this particular instance in time, no sub-folders or files within the home folder are synchronized, although such sub-folders and files exist at the remote computing system 130 and are referenced by the folder stubs 822 and file stub 824.

As described with reference to FIGS. 9A and 9B, the sub-folder "Flag Football 20101202" within the "Home" folder may be synchronized as a result of user-interaction with that folder. As a result, the synchronization scope may be expanded to include the sub-folder "Flag Football 20101202". In this case, the synchronization map 1102 may be modified to add the sub-folder "Flag Football 20101202". The synchronization map 1104 thus includes two paths that are to be synchronized, the path "Home:\" and the path "Home:\Flag Football 20101202\". As a result, during synchronization, the folder stubs and file stubs within the "Home" folder will be provided to the client device, as will the folder stubs and file stubs within the "Flag Football 20101202" folder.

As described with reference to FIG. 9C, the sub-folder "Fun pictures" within the "Flag Football 20101202" folder may be synchronized as a result of user-interaction with that folder. As a result, the synchronization scope may be expanded to include the sub-folder "Fun pictures". In this case, the synchronization map 1104 may be modified to add the sub-folder "Fun pictures". The synchronization map 1106 thus includes three paths that are to be synchronized, the path "Home:\", the path "Home:\Flag Football 20101202\", and the path "Home:\Flag Football 20101202\Fun pictures". As a result, during synchronization, the folder stubs and file stubs within the "Home" folder will be provided to the client device, as will any folder stubs and file stubs within the "Flag Football 20101202" folder and any folder stubs and file stubs within the "Fun pictures" folder. Notably, with reference to FIG. 9C, no folder stubs nor file stubs will be acquired by or sent to the client computing device 110 for unsynchronized folders such as the "alex stopped on john" folder and the "john-was-here" folder.

Finally, as described with reference to FIGS. 10D and 10E, the scope of synchronization may be contracted so as to exclude folders and sub-folders as a result of user interaction with at least one of those folders. For example, as described with reference to FIGS. 10D and 10E, a user may command the client device to de-synchronize the folder "Flag Football 20101202". As a result, the "Flag Football 20101202" folder may be de-synchronized as well as any hierarchy of sub-folders within the "Flag Football 20101202" folder, such as the "Fun pictures" sub-folder. In this particular case, the synchronization map 1106 may thus be modified so as to remove the sub-folder "Flag Football 20101202" as well as the synchronized sub-sub-folder "Fun pictures". The synchronization map 1108 thus excludes the path "Home:\Flag Football 20101202\" and the path "Home:\Flag Football 20101202\Fun pictures", and remains only with the path "Home:\". As a result, during synchronization, the folder stubs and file stubs within the "Home" folder will be provided to the client device, but no folder stubs nor file stubs for the "Flag Football 20101202" folder or "Fun pictures" folder will be provided.

While particular examples for expanding and contracting the scope of data synchronization in real-time as a result of user-interaction with that data has been described, it should be recognized that embodiments are not so limited to these examples. For example, for a complex file system provided at the remote computing system 130 and accessible to the client computing device 110, any number of folders, sub-folders, sub-sub-folders, etc. may be synchronized, and within any particular folder there may be a variety of combinations of sub-folders that are or are not synchronized.

Figure 12:
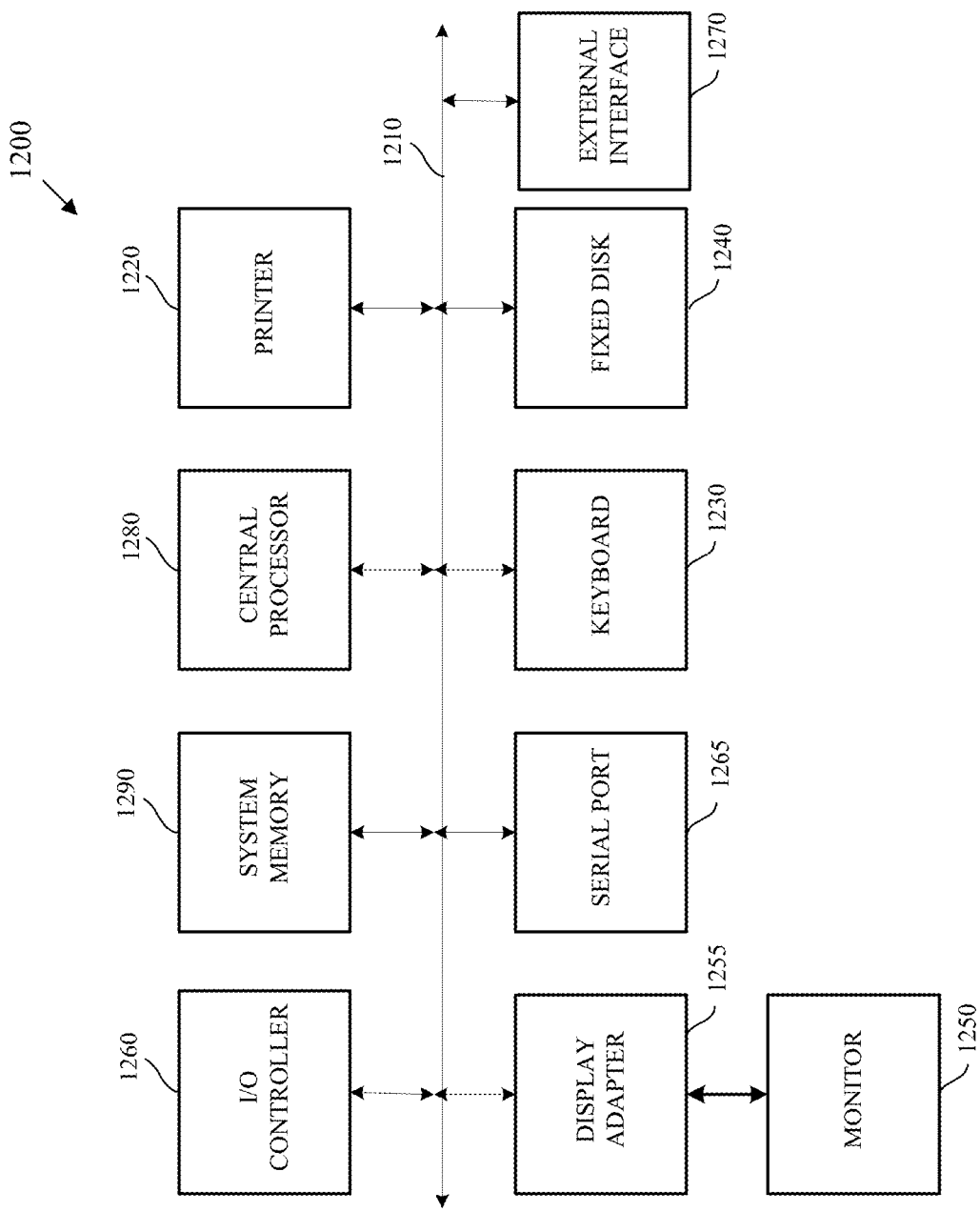
FIG. 12 is a diagram of a computer apparatus according to at least one embodiment.

FIG. 12 is a diagram of a computer apparatus 1200 according to some embodiments. The various elements in the previously described system diagram (e.g., one or more of client computing devices 110-120, and/or remote computing system 130) may use any suitable number of subsystems in the computer apparatus to facilitate the functions described herein. Examples of such subsystems or components are shown in FIG. 12. The subsystems shown in FIG. 12 are interconnected via a system bus 1210. Additional subsystems such as a printer 1220, keyboard 1230, fixed disk 1240 (or other memory comprising tangible, non-transitory computer-readable media), monitor 1250, which is coupled to display adapter 1255, and others are shown. Peripherals and input/output (I/O) devices (not shown), which couple to I/O controller 1260, can be connected to the computer system by any number of means known in the art, such as serial port 1265. For example, serial port 1265 or external interface 1270 can be used to connect the computer apparatus to a wide area network such as the Internet, a mouse input device, or a scanner. The interconnection via system bus allows the central processor 1280 to communicate with each subsystem and to control the execution of instructions from system memory 1290 or the fixed disk 1240, as well as the exchange of information between subsystems. The system memory 1290 and/or the fixed disk 1240 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of altering a scope of data synchronization at a client computing device, the method comprising:
   establishing, by the client computing device, a connection to a remote computing system that is located remotely from the client computing device;
   displaying representations of stub folders via the client computing device, each stub folder referencing a corresponding folder of information that is stored at the remote computing system but not stored at the client computing device;
   receiving a user selection of one of the stub folders;
   in response to receiving the user selection of one of the stub folders, displaying representations of stub sub-folders, each stub sub-folder referencing a corresponding sub-folder of information in the folder referenced by the selected stub folder which is stored at the remote computing system but not stored at the client computing device;
   receiving a user selection of one of the stub sub-folders to synchronize the selected stub sub-folder; and
   in response to receiving the user selection of the selected stub sub-folder referencing a sub-folder, synchronizing the sub-folder in the folder of information referenced by the selected stub sub-folder between the client computing device and the remote computing system resulting in a synchronized sub-folder of information without synchronizing other sub-folders in the folder of information referenced by the selected stub folder.

2. The method of claim 1, wherein synchronizing the sub-folder of information referenced by the selected stub sub-folder includes acquiring, from the remote computing system, information representative of file stubs and folder stubs located within the sub-folder of information referenced by the selected stub sub-folder, each file stub referencing a file stored at the remote computing system within the sub-folder of information referenced by the selected stub sub-folder.

3. The method of claim 2, further comprising:
   in response to receiving the user selection of one of the stub sub-folders, displaying the acquired file stubs and folder stubs.

4. The method of claim 1, wherein synchronizing the sub-folder of information referenced by the selected stub sub-folder includes expanding the scope of data synchronization to include the sub-folder of information referenced by the selected stub sub-folder.

5. The method of claim 4, wherein expanding the scope of data synchronization includes modifying a synchronization map to include a path to the sub-folder of information referenced by the selected stub sub-folder.

6. The method of claim 1, further comprising:
   in response to receiving the user selection of one of the stub sub-folders, replacing the displayed representation of the selected stub sub-folder with a graphical representation indicating that the sub-folder of information referenced by the selected stub sub-folder is synchronized between the client computing device and the remote computing system.

7. The method of claim 1, further comprising:
   receiving a new folder of information; and
   in response to receiving the new folder of information, synchronizing the new folder of information between the client computing device and the remote computing system resulting in a new synchronized folder of information.

8. The method of claim 7, wherein synchronizing the new folder of information includes expanding the scope of data synchronization to include the new folder and sub-folders located within the new folder.

9. A client computing device, comprising:
   a storage element for storing data;
   a user interface for providing information to a user and receiving inputs from the user;
   a communication interface for communicating with a remote computing system that is located remotely from the client computing device; and
   a processor coupled to the storage element, the user interface, and the communication interface, the processor being operable to:
      establish a connection to the remote computing system via the communication interface;
      display, via the user interface, representations of stub folders, each stub folder referencing a corresponding folder of information that is stored at the remote computing system but not stored at the client computing device;
      receive, via the user interface, a user selection of one of the stub folders;
      in response to receiving the user selection of one of the stub folders, display representations of stub sub-folders, each stub sub-folder referencing a corresponding sub-folder of information in the folder referenced by the selected stub folder which is stored at the remote computing system but not stored at the client computing device;
      receive a user selection of one of the stub sub-folders to synchronize the selected stub sub-folder; and
      in response to receiving the user selection of the selected stub sub-folder referencing a sub-folder, synchronize the sub-folder in the folder of information referenced by the selected stub sub-folder between the client computing device and the remote computing system resulting in a synchronized sub-folder of information.

10. The client computing device of claim 9, wherein the processor is further operable to:
    receive a command to de-synchronize the synchronized sub-folder of information; and
    in response to receiving the command to de-synchronize the synchronized sub-folder of information, de-synchronize the synchronized sub-folder of information.

11. The client computing device of claim 10, wherein the processor is further operable to:
in response to receiving the command to de-synchronize the synchronized sub-folder of information, generate a sub-folder stub that references the sub-folder of information at the remote computing system.

12. The client computing device of claim 10, wherein de-synchronizing the synchronized sub-folder of information includes deleting, at the client computing device, files, folders, file stubs, and folder stubs located within the synchronized sub-folder of information.

13. The client computing device of claim 10, wherein de-synchronizing the synchronized sub-folder of information includes contracting a scope of data synchronization to exclude the synchronized sub-folder of information.

14. The client computing device of claim 13, wherein contracting the scope of data synchronization includes modifying a synchronization map to exclude a path to the synchronized sub-folder of information and paths to sub-folders located within the synchronized sub-folder of information.

15. The client computing device of claim 10, wherein the processor is further operable to:
in response to receiving the command to de-synchronize the synchronized sub-folder of information, replace a graphical representation indicating that the sub-folder of information is synchronized between the client computing device and the remote computing system with a graphical representation of a stub sub-folder that references the sub-folder of information at the remote computing system.

16. A method of altering a scope of data synchronization at a remote computing system, the method comprising:
establishing, by the remote computing system, a connection to a client computing device that is located remotely from the remote computing system;
receiving, from the client computing device, a reference to a folder of information stored at the remote computing system but not stored at the client computing device, the reference being generated from one of a plurality of stub folders and in response to a user selection of the one of the plurality of stub folders;
receiving, from the client computing device, a reference to a sub-folder of information in the folder which is stored at the remote computing system but not stored at the client computing device to synchronize the sub-folder; and
in response to receiving the reference to the sub-folder of information stored at the remote computing system, synchronizing the sub-folder of information between the client computing device and the remote computing system resulting in a synchronized sub-folder of information without synchronizing other sub-folders in the folder of information.

17. The method of claim 16, wherein synchronizing the sub-folder of information includes communicating, to the client computing device, file stubs and folder stubs located within the sub-folder of information, each file stub referencing a file stored at the remote computing system within the sub-folder and each folder stub referencing a folder stored at the remote computing system within the sub-folder.

18. The method of claim 16, wherein synchronizing the sub-folder of information includes expanding the scope of data synchronization to include the sub-folder of information.

19. The method of claim 18, wherein expanding the scope of data synchronization includes modifying a synchronization map to include a path to the sub-folder of information.

20. The method of claim 16, further comprising:
receiving a new folder of information from the client computing device; and
in response to receiving the new folder of information, expanding the scope of data synchronization to include the new folder of information and sub-folders located within the new folder.

21. A remote server computing system, comprising:
a storage element for storing data;
a communication interface for communicating with a client computing device that is located remotely from the remote computing system; and
a processor coupled to the storage element and the communication interface, the processor being operable to:
establish a connection to the client computing device via the communication interface;
receive, from the client computing device and via the communication interface, a reference to a folder of information stored in the storage element of the remote computing system but not stored at the client computing device, the reference being generated from one of a plurality of stub folders and in response to a user selection of the one of the plurality of stub folders;
receive, from the client computing device, a reference to a sub-folder of information in the folder which is stored in the storage element of the remote computing system but not stored at the client computing device to synchronize the sub-folder; and
in response to receiving the reference to the sub-folder of information stored in the storage element of the remote computing system, synchronize the sub-folder of information between the client computing device and the remote computing system resulting in a synchronized sub-folder of information without synchronizing other sub-folders in the folder of information.

22. The remote server computing system of claim 21, wherein the processor is further operable to:
receive, from the client computing device, a command to de-synchronize the synchronized sub-folder of information; and
in response to receiving the command to de-synchronize the synchronized sub-folder of information, de-synchronize the synchronized sub-folder of information.

23. The remote server computing system of claim 22, wherein de-synchronizing the synchronized sub-folder of information includes contracting a scope of data synchronization to exclude the synchronized sub-folder of information.

24. The remote server computing system of claim 23, wherein contracting the scope of data synchronization includes modifying a synchronization map to exclude a path to the synchronized sub-folder of information and paths to sub-folders located within the synchronized sub-folder of information.

25. The remote server computing system of claim 22, wherein de-synchronizing the synchronized sub-folder of information includes modifying file synchronization properties of files located within the sub-folder of information and sub-folders located within the sub-folder of information, the file synchronization properties being modified to indicate that the files are not synchronized.

* * * * *